(12) United States Patent
Dagley et al.

(10) Patent No.: US 9,042,701 B2
(45) Date of Patent: May 26, 2015

(54) COLLAPSIBLE CABLE REEL

(75) Inventors: Mark Robert Dagley, Ft. Worth, TX (US); Susan Elizabeth Semmler, Roanoke, TX (US); Antwan Joco'ques Works, Lewisville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 666 days.

(21) Appl. No.: 13/275,815

(22) Filed: Oct. 18, 2011

(65) Prior Publication Data

US 2012/0104145 A1 May 3, 2012

Related U.S. Application Data

(60) Provisional application No. 61/394,663, filed on Oct. 19, 2010, provisional application No. 61/440,220, filed on Feb. 7, 2011.

(51) Int. Cl.
*G02B 6/00* (2006.01)
*G02B 6/44* (2006.01)
*B65H 75/22* (2006.01)
*B65H 75/24* (2006.01)

(52) U.S. Cl.
CPC .............. *G02B 6/4457* (2013.01); *B65H 75/22* (2013.01); *B65H 75/241* (2013.01)

(58) Field of Classification Search
CPC ..................................... G02B 6/4457
USPC ................................. 385/135–136
See application file for complete search history.

(56) References Cited

U.S. PATENT DOCUMENTS

| 63,519 | A | 4/1867 | Horton |
|---|---|---|---|
| 2,046,883 | A | 7/1936 | Robbins |
| 2,170,764 | A | 8/1939 | Penman |
| 2,463,192 | A | 3/1949 | Mackey et al. |
| 2,511,701 | A | 6/1950 | Eldredge |
| 3,058,688 | A | 10/1962 | Abel |
| 4,381,087 | A | 4/1983 | Williams |
| 5,710,855 | A | 1/1998 | Konwitz |
| 6,301,424 | B1 | 10/2001 | Hwang |

(Continued)

FOREIGN PATENT DOCUMENTS

| JP | 54084580 U | 6/1979 |
|---|---|---|
| JP | 649965 A | 1/1989 |

(Continued)

OTHER PUBLICATIONS

Non-final Office Action for U.S. Appl. No. 13/348,929 mailed Dec. 23, 2013, 8 pages.
International Preliminary Report on Patentability for International patent application PCT/US2012/37082 mailed Nov. 19, 2013, 7 pages.

(Continued)

*Primary Examiner* — Ryan Lepisto

(57) ABSTRACT

A collapsible cable reel comprising a frame assembly having with a first end and a second end and at least one cable support is disclosed. A first end assembly releasably connects to the first end of the frame assembly and a second end assembly releasably connects to the second end of the frame assembly. At least one cable support extends from the frame assembly to the first end assembly and is adapted to support a length of cable wound around the collapsible cable reel. The length of the at least one cable support and the frame assembly are shortenable allowing the first end assembly to move closer to the second end assembly and the collapsible cable reel to move from a first position to a second position.

22 Claims, 23 Drawing Sheets

(56) References Cited

U.S. PATENT DOCUMENTS

| | | |
|---|---|---|
| 6,571,047 B1 | 5/2003 | Yarkosky et al. |
| 6,612,515 B1 | 9/2003 | Tinucci et al. |
| 7,079,745 B1 * | 7/2006 | Weinert et al. ............... 385/135 |
| 7,477,839 B2 | 1/2009 | Funahashi et al. |
| 2003/0038209 A1 | 2/2003 | Remeczky |
| 2003/0095772 A1 | 5/2003 | Solheid et al. |
| 2005/0201710 A1 | 9/2005 | Clark et al. |
| 2005/0226588 A1 | 10/2005 | Pons |
| 2008/0292261 A1 * | 11/2008 | Kowalczyk et al. .......... 385/135 |
| 2008/0296426 A1 | 12/2008 | Cairns et al. |
| 2010/0166376 A1 | 7/2010 | Nair et al. |
| 2013/0183017 A1 | 7/2013 | de los Santos Campos et al. |

FOREIGN PATENT DOCUMENTS

| | | |
|---|---|---|
| JP | 64009965 U | 1/1989 |
| JP | 6305682 A | 11/1994 |
| WO | 2009048680 A9 | 4/2009 |

OTHER PUBLICATIONS

International Search Report for International patent application PCT/US12/37082 mailed Jul. 8, 2012, 5 pages.

Final Office Action for U.S. Appl. No. 13/348,929 mailed Oct. 15, 2014, 8 pages.

Advisory Action for U.S. Appl. No. 13/348,929 mailed Mar. 13, 2015, 2 pages.

* cited by examiner

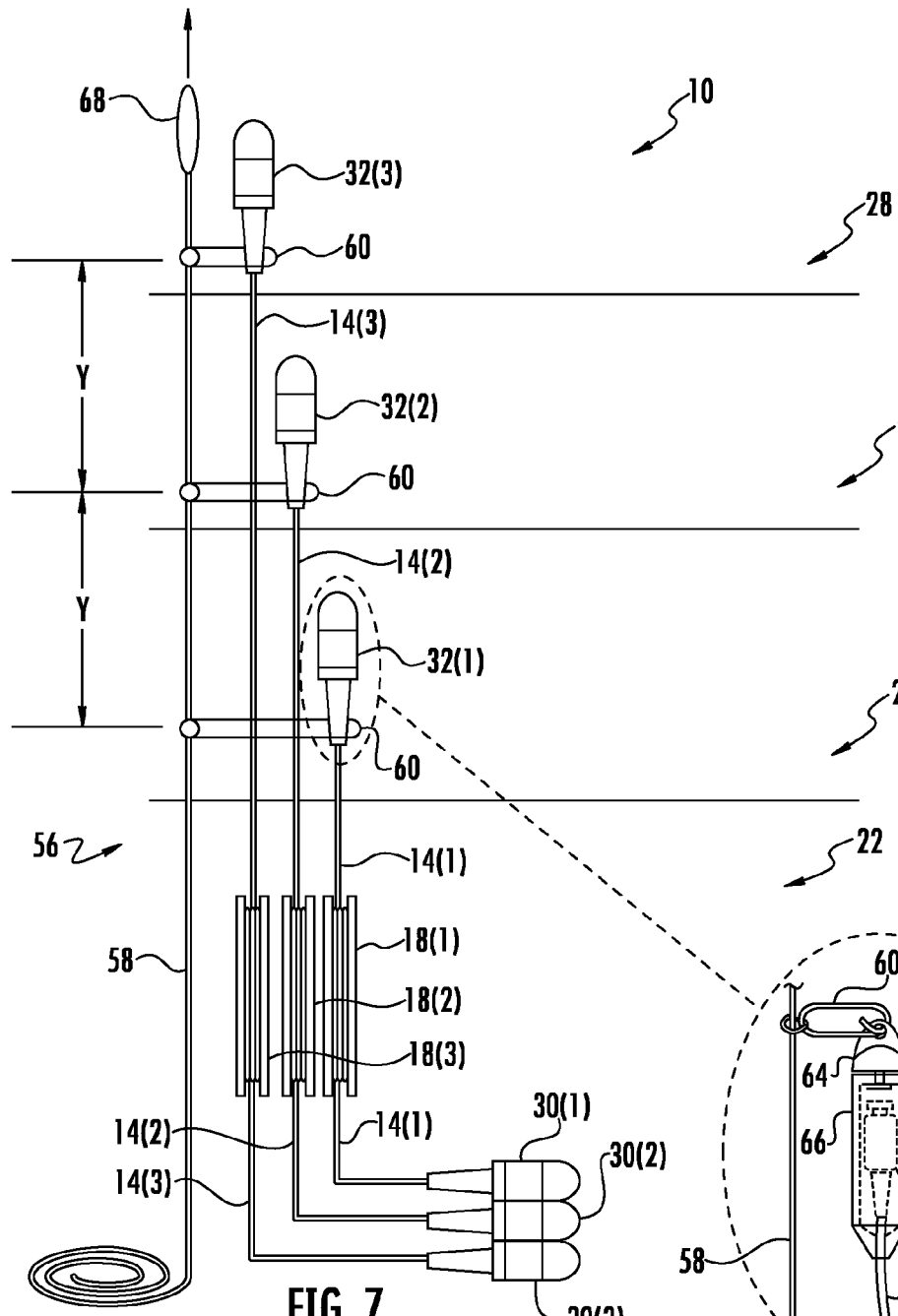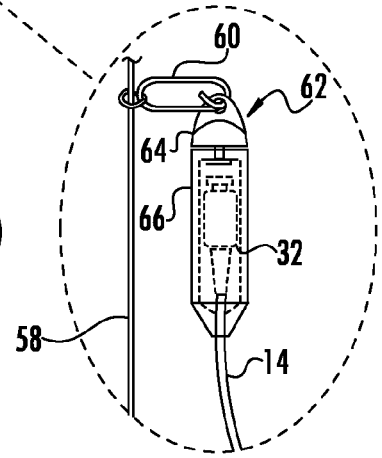
FIG. 7
FIG. 7A

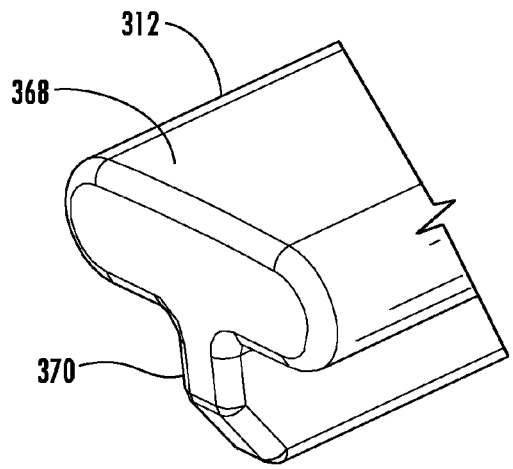
FIG. 19
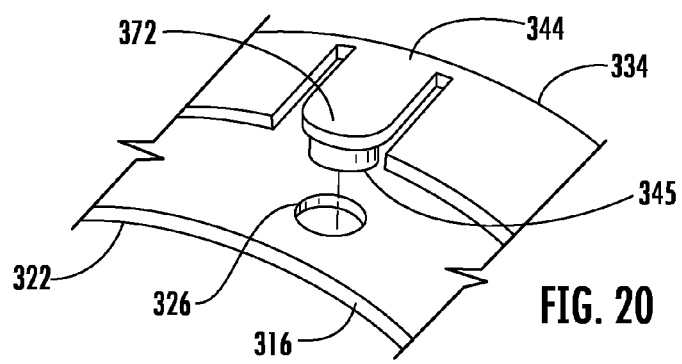
FIG. 20
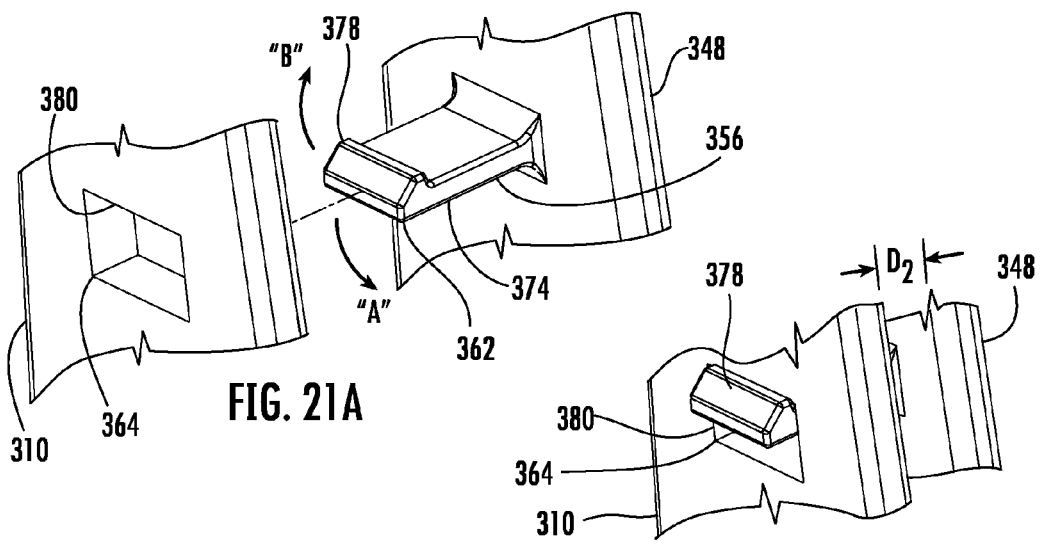
FIG. 21A
FIG. 21B

COLLAPSIBLE CABLE REEL

RELATED APPLICATIONS

This present application claims the benefit of priority under 35 U.S.C. §119 to U.S. Provisional Patent Application Ser. No. 61/394,663 filed on Oct. 19, 2010 and entitled "Collapsible Cable Reel," which is incorporated herein by reference in its entirety.

This present application claims the benefit of priority under 35 U.S.C. §119 to U.S. Provisional Patent Application Ser. No. 61/440,220 filed on Feb. 7, 2011 and entitled "Collapsible Cable Reel," which is incorporated herein by reference in its entirety.

BACKGROUND

1. Field of the Disclosure

The disclosure relates to a cable reel and particularly a collapsible cable reel for fiber optic cable. The collapsible cable reel can be used to pay out fiber optic cable fiber optic network installations, for example, multiple dwelling unit installations. After a selected length of fiber optic cable is payed out from the collapsible reel, the collapsible reel can be collapsed or reduced in size to a smaller foot print and mounted in an enclosure for use as a slack storage spool.

2. Technical Background

In the world of the ever-increasing need for broadband bandwidth optical cables have become the main part of telecommunication networks. Optical cables can transmit voice signals, data signals and video signals for very long distances with very high speed. Developments of optic telecommunication networks allow the connection of the end user directly to the optical fiber. This kind of network technology known as FTTH technology (fiber to the home) requires extending an "all optical" communication network closer to the subscribers. As a result such telecommunication networks include large number distribution points from a distribution cable to an end user or subscriber.

One of the key parts of the FTTH network is the last mile connection which often is an indoor installation. Different kind of buildings like multiple dwelling units and block of apartments require complicated cabling systems which might mean that there are many separate cables, each one to connect one subscriber. Installation of many cables which provide the connection between a main distribution point (which usually is located in the basement or in another place of the building) and the end user may cause problems with routing through the wall or levels of the building. As a result, such installations consume a lot of time and costs.

SUMMARY

Embodiments disclosed in the detailed description include a collapsible cable reel. A collapsible cable reel comprising a frame assembly with a first end and a second end and at least one cable support. A first end assembly releasably connects to the first end of the frame assembly and a second end assembly releasably connects to the second end of the frame assembly. The at least one cable support extends from the frame assembly to the first end assembly and is adapted to support a length of cable wound around the collapsible cable reel. The length of the at least one cable support is shortenable allowing the first end assembly to move closer to the second end assembly and the collapsible cable reel to move from a first position to a second position.

The first position of the collapsible cable reel may be an uncollapsed state, while the second position of the collapsible cable reel may be a collapsed state. The frame assembly may comprise a center member having a frame hub and an extension member. The center member may be shortenable in length by removing the extension member allowing the first end assembly to move closer to the second end assembly and the collapsible cable reel to move from a first position to a second position. Alternatively or additionally, the center member may comprise a telescoping extension member, with the center member being shortenable by reducing the length of the telescoping extension member.

The frame assembly may comprise at least one frame arm extending radially from the frame hub. The first end assembly may comprise at least one first end arm extending radially from the first end hub, and the second end assembly may comprise at least one second end arm extending radially from the second end hub. Alternatively or additionally, the frame assembly may comprise a frame disk connected to the frame hub. The first end assembly may comprise a first disk connected to the first end hub, and the second end assembly may comprise a second disk connected to the second end hub.

The collapsible cable reel may have at least 100 feet of cable wound on it. The cable may be fiber optic cable, such as without limitation, riser cable or drop cable for a multiple dwelling unit. The collapsible cable reel is adapted to store cable slack in at least one of the first position and second position. The collapsible cable reel may be removably mountable in an enclosure, in one or both of the first position and the second position.

In another embodiment, a method of operating a collapsible cable reel is disclosed. The method may comprise providing a collapsible cable reel having a first end and a second end on which cable is wound. The first end and the second end are separated by a distance. The method may include paying out at least a portion of the cable, retaining remaining slack of the cable not payed out on the collapsible cable reel, and collapsing the collapsible cable reel by reducing the distance between the first end and the second end. The method may also include removably mounting the collapsed collapsible cable reel with the retained remaining slack of the cable in an enclosure. The cable may be fiber optic cable. The fiber optic cable may be riser cable or drop cable, used in a multiple dwelling unit.

The collapsible cable reel of the method may comprise a frame assembly having with a first end and a second end and at least one cable support, a first end assembly connected to the first end of the frame assembly, and a second end assembly connected to the second end of the frame assembly. At least one cable support may extend from the frame assembly to the first end assembly and is adapted to support a length of cable wound around the collapsible cable reel. The method may include shortening at least one cable supports to allow the first end assembly to move closer to the second end assembly and the collapsible cable reel to move from a first position to a second position.

In another embodiment, a method of operating a collapsible cable reel is disclosed. The method including providing a frame assembly having with a first end and a second end and a plurality of cable supports, a first end assembly connected to the first end of the frame assembly and a second end assembly connected to the second end of the frame assembly. A plurality of cable supports extend from the frame assembly to the first end assembly and is adapted to support a length of cable wound around the collapsible cable reel. The length of the plurality of cable supports is shortenable. The method may also include paying out at least a portion of the length of cable, retaining remaining slack of the cable not payed out on the cable supports, and shortening a length of each of the plurality of cable supports allowing the first end assembly to move closer to the second end assembly and the collapsible cable reel to move from a first position to a second position. The length of cable wound on the cable supports is at least 100 feet. The cable is fiber optic cable. The fiber optic cable is one of riser cable and drop cable, used in a multiple dwelling unit. The method may also include removably mounting the collapsible cable reel in an enclosure.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 7 is a schematic diagram of an elevation view of an exemplary preconnectorized riser cable installation assembly with a plurality of preconnectorized riser cables being extended from payout reels located at a lower level by a leader with extending features attached to the leader at preset locations;

FIG. 7A is a detail view of an exemplary pull device assembly which may be attached to the end of the riser cable to facilitate extending the riser cable from the payout reel;

FIG. 19 is a schematic diagram of a detailed, perspective view of the end of a cable support of the collapsible cable reel of FIG. 16;

FIG. 20 is a schematic diagram of a detailed, perspective view of a snap lock on a first end hub in exploded relationship to the second end of the center member at the extension member of the collapsible cable reel of FIG. 16;

FIG. 21A is a schematic diagram of a detailed, perspective view of a locking tab on a second end arm in exploded relationship to a receiver in a frame arm of the collapsible cable reel of FIG. 16;

FIG. 21B is a schematic diagram of a detailed, perspective view of the locking tab releasably attached in the receiver of FIG. 21A;

DESCRIPTION OF THE DISCLOSURE

Figure 1:
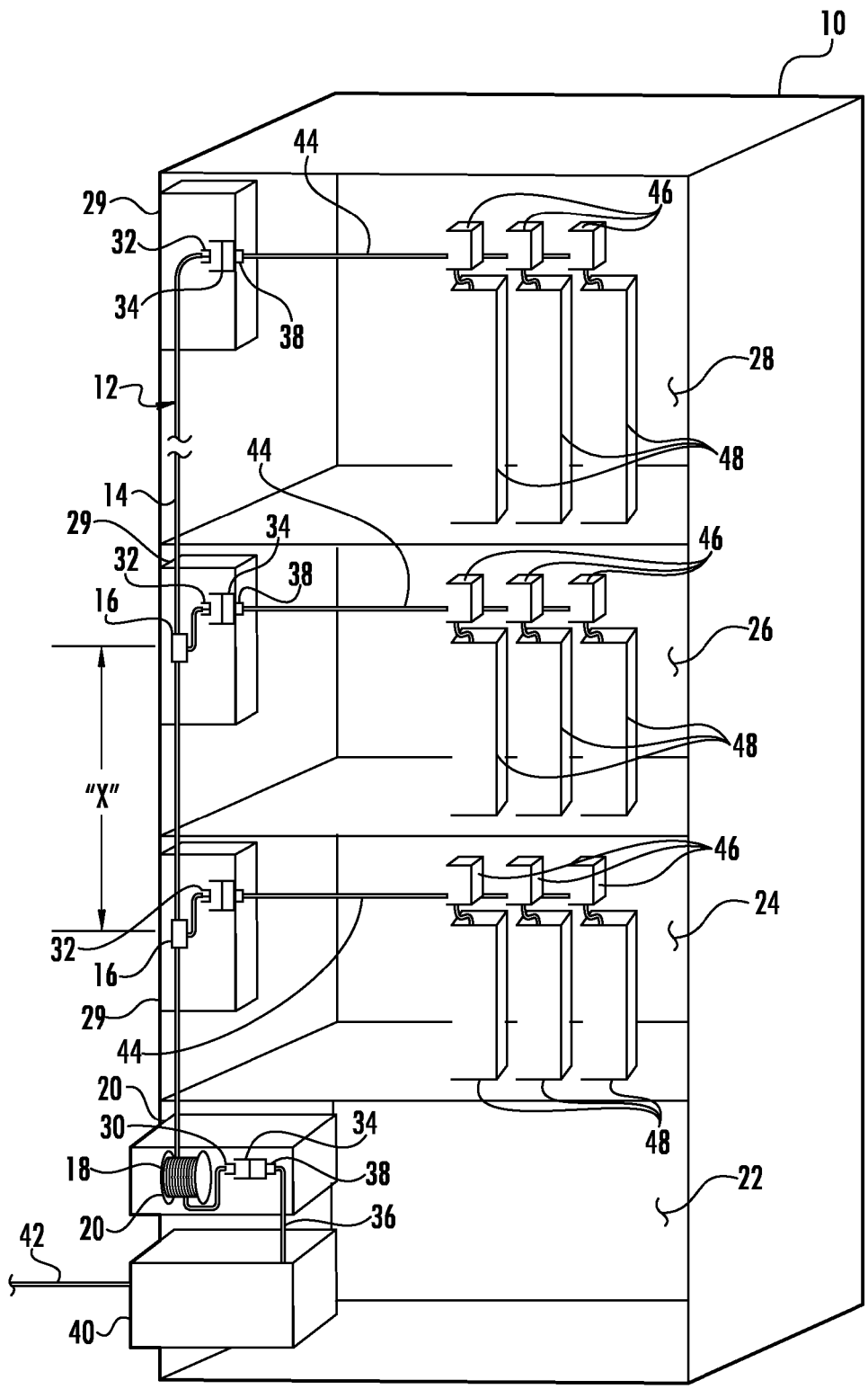
FIG. 1 is a schematic diagram of a perspective elevation view of a multiple dwelling unit (MDU) with an exemplary fiber optic network installed therein, wherein a riser cable with pre-set tap points extends from a payout reel in a patch panel enclosure located at a lower level to multiple distribution levels.

Embodiments disclosed in the detailed description include a fiber optic distribution network for a multi-floor multiple dwelling unit (MDU). The network includes a local convergence point (LCP) which may be located in a lower level of the MDU, for example, the basement. The LCP receives a feeder cable that provides optical communication service to the MDU from a service provider. One or more preconnectorized riser cables having multi-fiber connectors on each end optically connect to the feeder cable through the LCP. The riser cable extends from the LCP to one or more upper distribution levels of the MDU. At the distribution level, the riser cable is received by a network access point. The connection between the riser cable and the subscriber premises may be through tether cables branched off from the riser cable at each distribution level. The tether cables may then be connected to subscriber premises via one or more drop cables at the network access point. Alternatively, or additionally, an individual riser cable may be extended to the distribution level. The network access point may be referred to as a transition box, a fiber distribution terminal (FDT), or patch panel enclosure. As such, reference to a transition box herein shall be understood to mean either or both a FDT or patch panel enclosure.

The FDT may include one or more multi-fiber-to-multi-fiber adapters to provide for connection of the riser cable to one or more drop cables. The drop cable extends to the subscriber premises at that distribution level to provide optical communication service to the subscriber. Any riser cable slack may be stored in one or more of the FDT or a slack enclosure. Additionally, the riser cable slack may be stored on the payout reel, with the payout reel removably mounted in the FDT, a patch panel enclosure, or the slack enclosure. The slack storage enclosure and/or transition box may be located at or adjacent to the LCP or at the distribution level.

The multi-fiber-to-multi-fiber adapters located at the network access point may have dual shutters, one on each end of the adapter. The shutters are adapted to be automatically closed against the end of the adapter when a multi-fiber connector is not inserted in that end of the adapter. In this manner, the shutters may provide sealing of the adapter against the environment, keeping the adapter protected and clean when not in use. The multi-fiber adapter may be keyed up and down to coordinate with the polarity of the multi-fiber connectors. The adapters may be mounted in a cassette which is removably mounted in the network access point. Alternatively, the adapter may be removably mounted to a panel which may be removably mounted in the network access point.

Further, the FDT, the patch panel enclosure and/or the slack storage enclosure may be located in the stair well of a MDU and provide a termination point for cable pulled or dropped vertically in the MDU. When located in the stairwell the FDT may mounted on, to or in proximity to a conduit, and in such case be referred to as a "Pipe-n-Box" or a "Pencil Box." The FDT may provide a point at which riser cable transitions to one or more drop cables and/or in generally horizontal cable runs. This location also serves as a point at which riser cable slack may be stored. The FDT, the patch panel enclosure and/or the slack storage enclosure may also be located within a telecommunications closet and referred to as a "closet box." The solution may include one or more of the FDTs, the patch panel enclosure and/or the slack storage enclosures in the stairwell, telecommunications closet, and/or by the LCP.

The FDT, the patch panel enclosure and/or the slack storage enclosure may have an enclosure with pivotable panel having a first side and a second side mounted therein. Fiber optic adapters may mount to the pivotable panel and may be accessed from the first side or the second side by pivoting the pivotable panel.

A collapsible cable reel may be included. The collapsible cable reel acts as a conventional cable reel for shipping cable to customers and for paying out cable for installation. Additionally, though, the collapsible cable reel may be reduced to a smaller form factor and mounted in an enclosure, for example, a FDT, the patch panel enclosure and/or the slack storage enclosure, and function as a modular slack storage spool. In this regard, users may pay out or dispensed the cable from the collapsible cable reel to or in a riser, as a riser cable, or at a distribution level as drop cable. Additionally, the riser cable or drop cable may be terminated or connected to each other or connected to a distribution cable extending toward a LCP that provides the optical communication service to the MDU. Cable slack may be stored within the FDT, the patch panel enclosure and/or the slack storage enclosure either in a lower level, for example a basement, in a stairwell or in a telecommunications closet.

The collapsible cable reel may have a frame assembly with a center member that has removable, telescoping and/or adjustable extension member, and a first end and a second end. A first end assembly may connect to one of the first and second ends and a second end assembly may connect to the other of one of the first and second ends. One or more arms may extend radially from a frame hub, a first end hub, and/or a second end hub. A plurality of cable supports may extend between the frame assembly and the first end assembly. The plurality of cable supports are adapted to support a length of cable wound around the collapsible cable reel. The length of each of the plurality of cable supports is shortenable and/or movable allowing the collapsible cable reel to reduce in length moving the first end assembly toward the second end assembly. In this manner the collapsible cable reel may move from an uncollapsed state toward a collapsed state. The collapsible cable reel is mountable in an enclosure providing cable slack storage.

Figure 11:
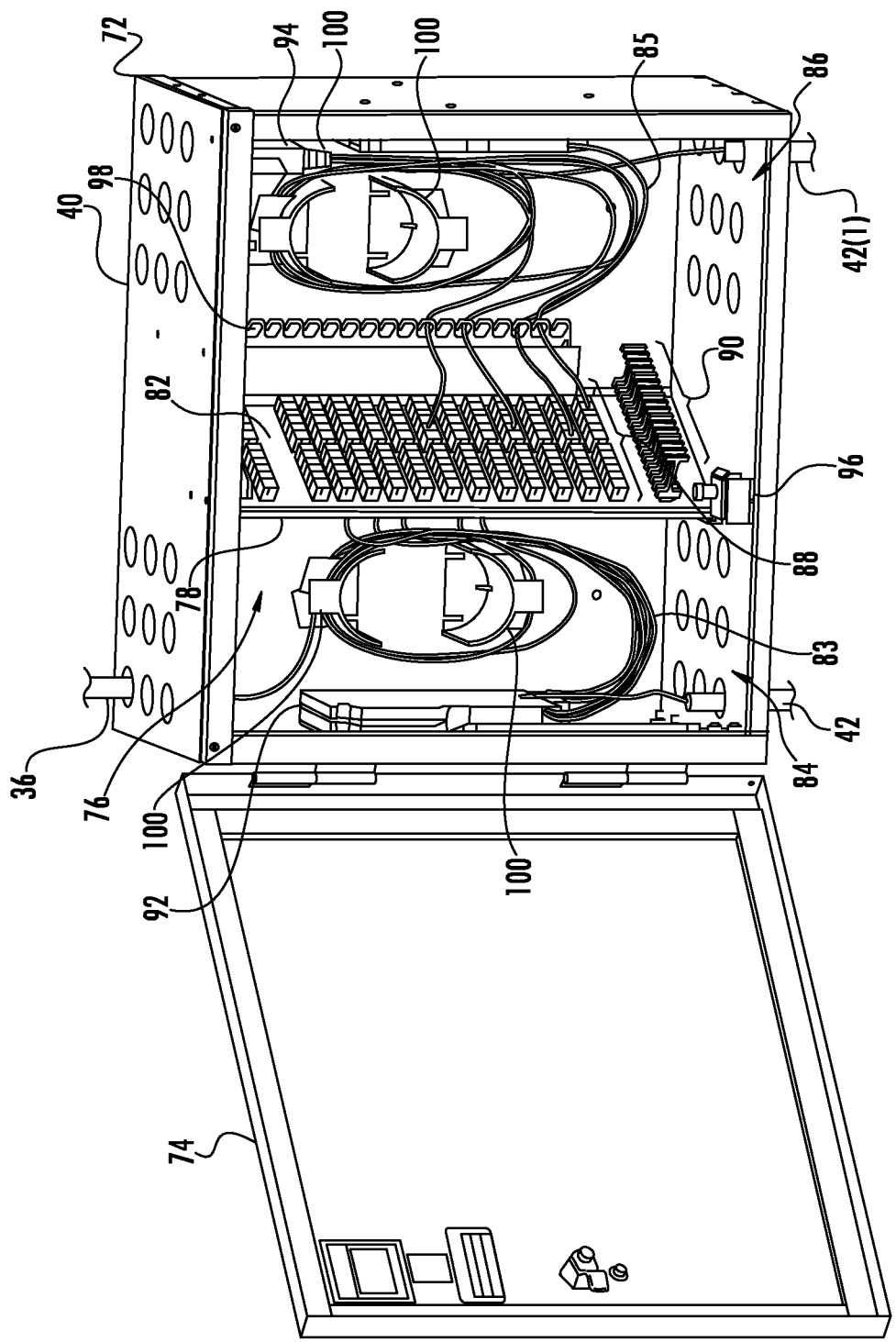
FIG. 11 is a schematic diagram of a front, perspective view of an exemplary local convergence point (LCP) for use with a fiber optic network in a MDU.
Figure 12:
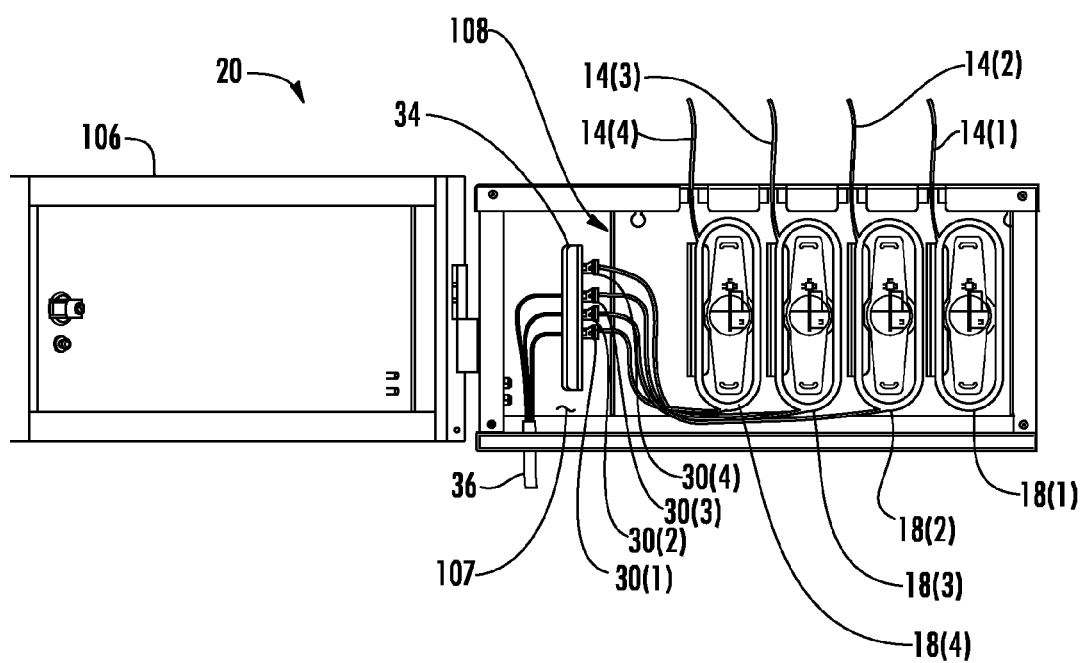
FIG. 12 is a schematic diagram of front, elevation views of an exemplary patch panel enclosure with a multi-fiber adapter assembly and multiple payout reels removably mounted therein.
Figure 13:
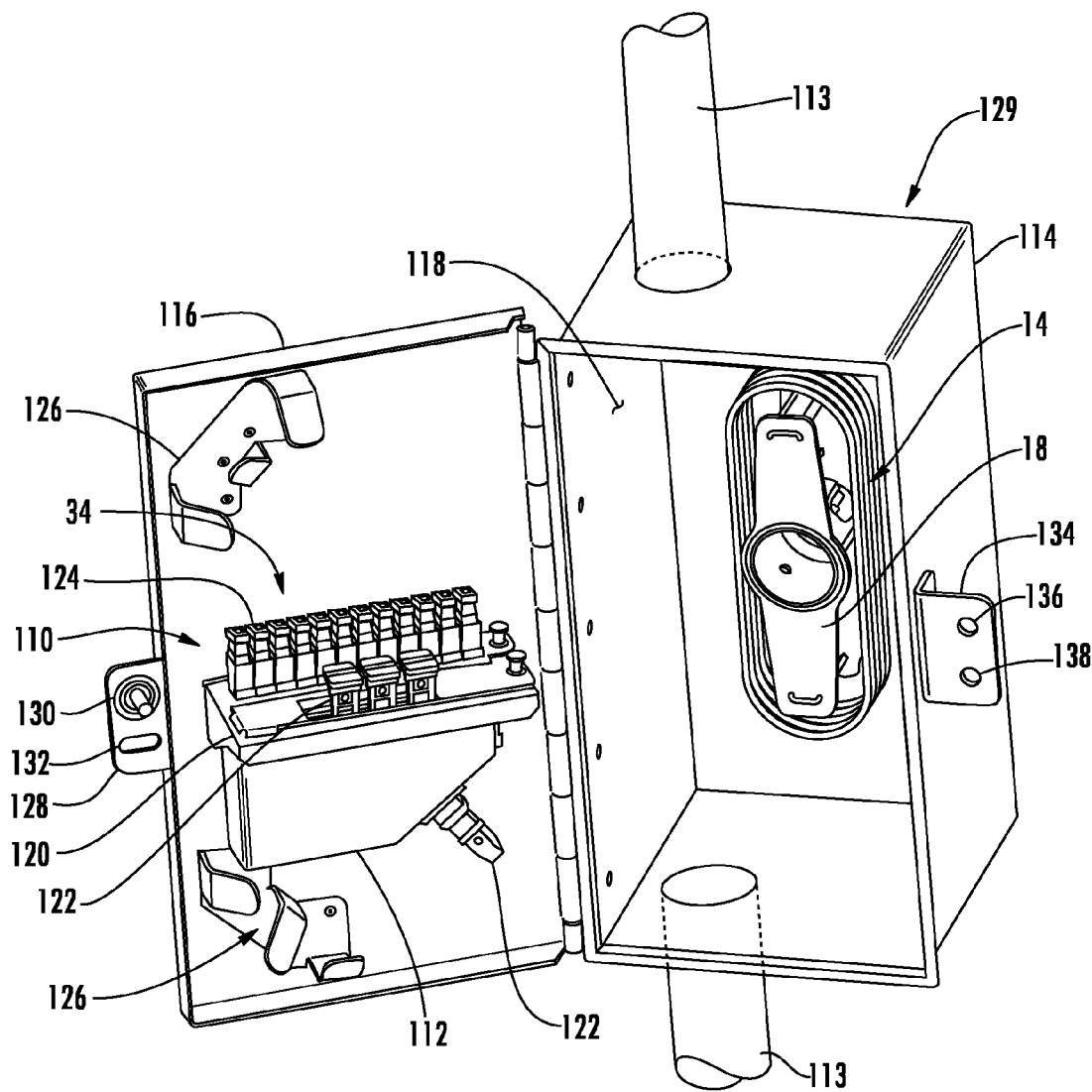
FIG. 13 is a schematic diagram of a front, perspective view of an exemplary FDT having a module with multi-fiber adapters and single fiber adapters and a payout reel removably mounted therein, wherein the FDT is configured to be mounted in-line with and supported by the conduit carrying the riser cable.
Figure 14:
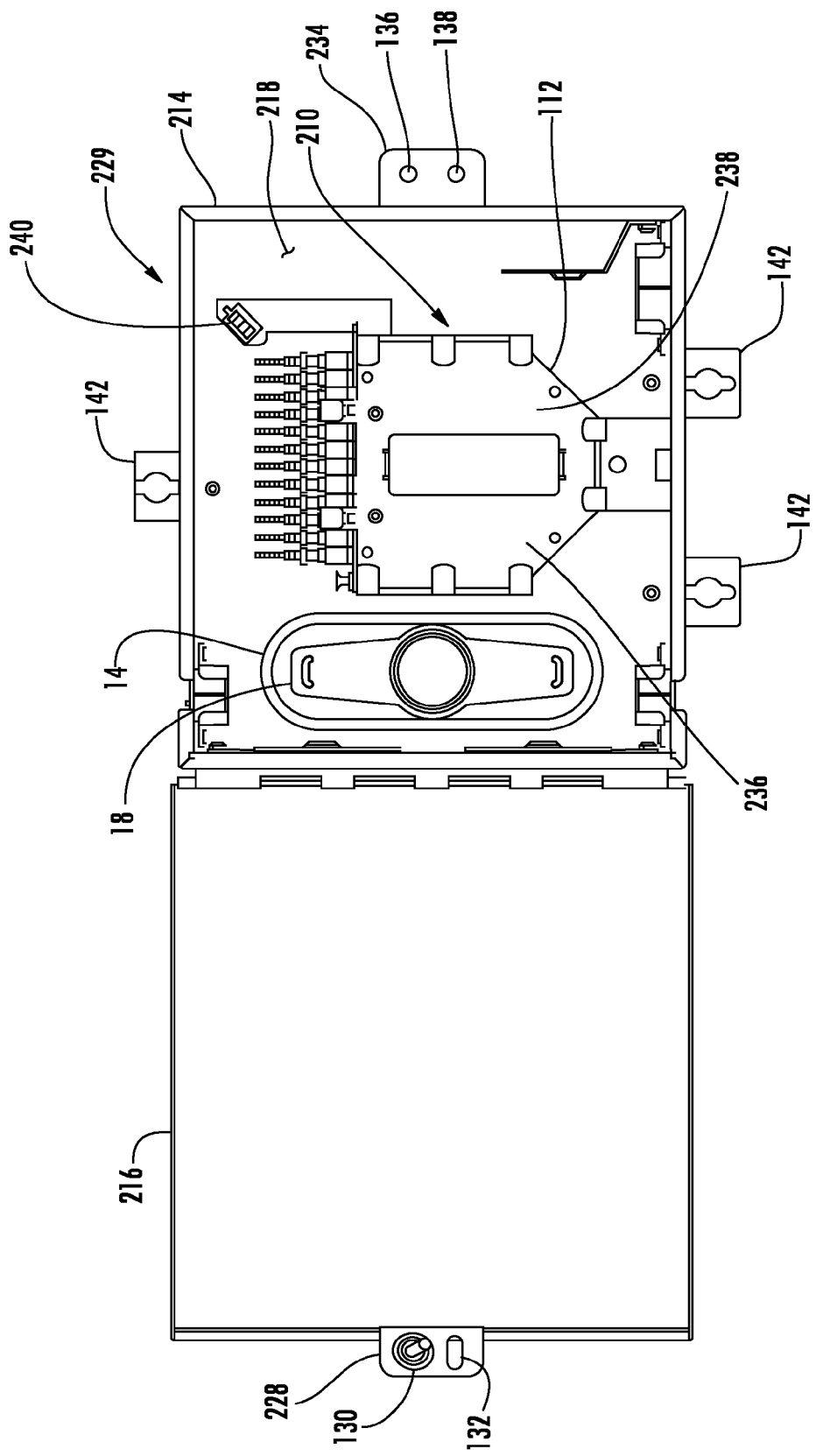
FIG. 14 is a schematic diagram of a front, perspective view of an exemplary FDT having a module assembly with multi-fiber adapters and single fiber adapters pivotably mounted therein and a collapsible payout reel removably mounted therein, wherein the FDT is configured to be wall or closet mounted.
Figure 15:
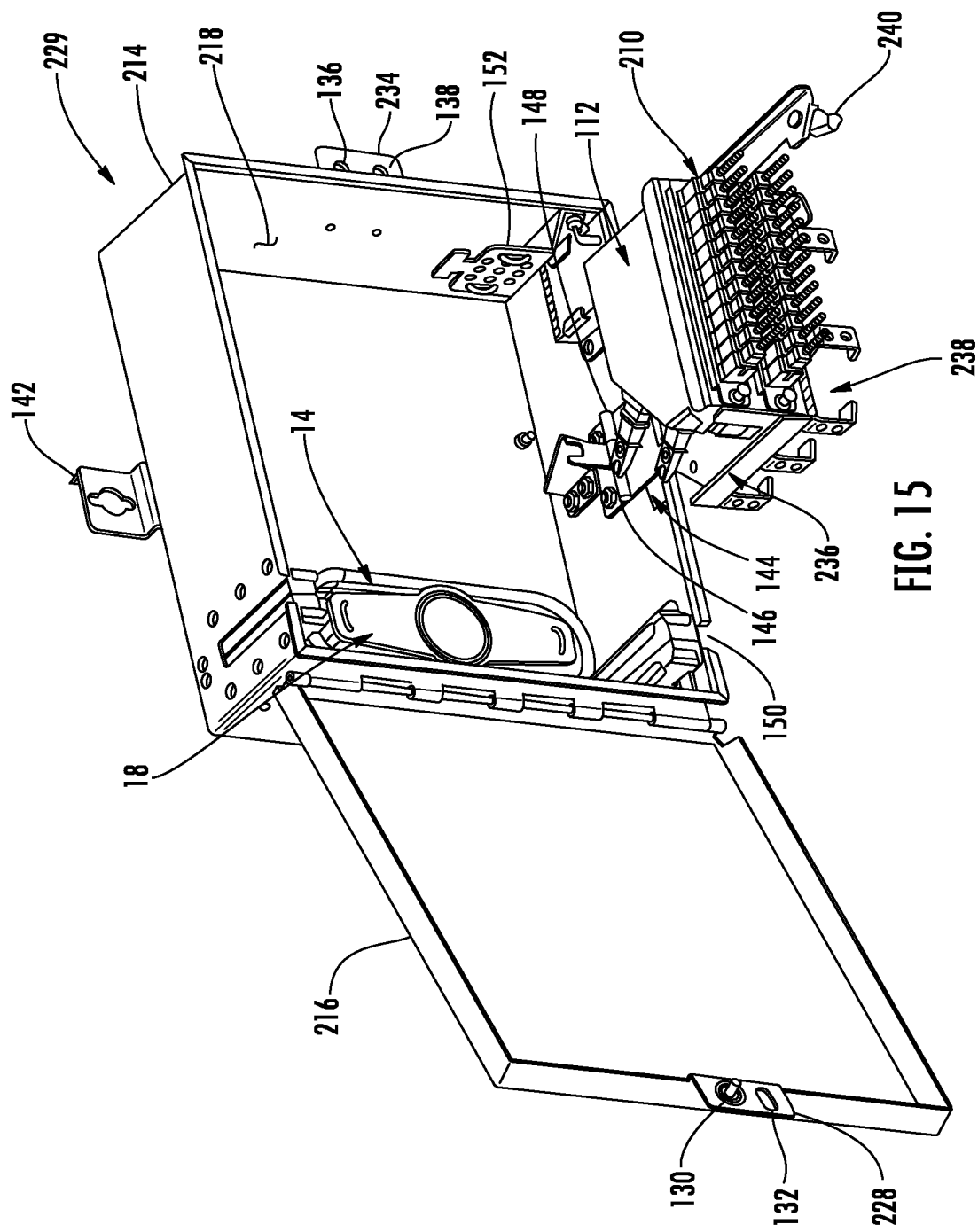
FIG. 15 is a schematic diagram of the front, perspective view of the FDT of FIG. 14 with the module assembly pivoted to an open position.

In this regard, the figures included herein are organized such that FIGS. 1-6 illustrate exemplary embodiments of fiber optic networks in an MDU; FIGS. 7-10 illustrate exemplary embodiments of installed riser cables along with methods for installing the riser cables; FIGS. 11-11C illustrate exemplary embodiments of the LCP; FIG. 12 illustrates an exemplary embodiment of the patch panel enclosure; FIGS. 13-15 illustrate exemplary embodiments of the FDT; and FIGS. 16-28 illustrates an exemplary embodiment of the collapsible cable reel.

Referring now to FIG. 1, there is shown a schematic diagram of a perspective elevation view of the MDU 10 with an exemplary fiber optic network 12 installed therein. A riser cable 14 with pre-set mid-span access points 16 extends from a payout reel 18. The riser cable 14 pays out from a payout reel 18. Once the riser cable 14 is paid out from the payout reel 18 to multiple distribution levels 24, 26, 28, the payout reel 18 is removably mounted in a patch panel enclosure 20. Although, in FIG. 1 three higher levels 24, 26, 28 are illustrated, the fiber optic network 12 may have any number of distribution levels. The riser cable 14 is preconnectorized with multi-fiber connectors 30, 32 at each end of the optical fibers of the riser cable 14. The patch panel enclosure 20 has a multi-fiber-to-multi-fiber adapter assembly 34 which receives a first multi-fiber connector 30. A distribution cable 36 preconnectorized with a multi-fiber connector 38, is received by and connects to the multi-fiber adapter assembly 34 in the patch panel enclosure 20 to establish an optical connection between the riser cable 14 and the distribution cable 36. The distribution cable 36 routes to a local convergence point (LCP) 40. The LCP 40 receives a feeder cable 42 which provides optical communication service to the MDU 10 from a service provider.

During installation, the riser cable 14 pays out from the payout reel 18 such that the riser cable 14 extends generally in an upward direction from the lower level 22 to each ascending distribution level 24, 26, 28 in succession with distribution level 28 being the highest distribution level in the MDU 10. The mid-span access points 16 are preset such that they are separated by a distance "X" along the length of the riser cable 14. The distance "X" is preset at the factory to a certain value depending on the distance between adjoining distribution levels 24, 26. As examples, the distance "X" may be set at 10 feet, 12 feet, 14 feet, 15 feet, and the like. In this manner, as the riser cable 14 pays out and installed in the MDU 10, the preset mid-span access points will align, generally with each distribution level 24, 26 of the MDU 10. However, the one exception to this may be the highest distribution level 28, since the end of the riser cable 14 would extend to that level and and would not have a mid-span access point. Any riser cable 14 slack due to the presetting of the distance "X" or otherwise, may be stored on the payout reel 18, in the patch panel enclosure 20 and/or a slack enclosure (not shown in FIG. 1). Slack may also be stored loosely at the lower level 22, in one or more fiber distribution terminals 29 located at one or more of the distribution levels 24, 26, 28. Additionally, the payout reel 18 may be removably mounted in the slack housing or may be mounted or located separate from the patch panel enclosure 20 and/or slack enclosure and/or from the FDT 29 at one or more of the distribution levels 24, 26, 28.

The riser cable 14 may be any number of optical fibers, as non-limiting examples, 6-216 fibers. At each mid-span access point 16, certain of the optical fibers may be furcated or separated out from the riser cable 14 in a FDT 29 located at the distribution level 24, 26. As examples, 6, 8 or 12 fibers may be furcated or separated out from the riser cable 14 and terminated with the second multi-fiber connector 32. At the highest distribution level 28, the optical fibers remaining in the riser cable 14 after furcating out the optical fibers at lower distribution levels 24, 26 are terminated with the second multi-fiber connector 32. The second multi-fiber connector 32 may be received by a multi-fiber adapter assembly 34 removably mounted in the FDT 29 at the distribution level 24, 26, 28. Alternatively, instead of the multi-fiber adapter assembly 34, the second multi-fiber connector may be received by and connected to a connector module (not shown in FIG. 1) removably mounted in the FDT 29.

A multi-fiber bundled drop cable 44 preconnectorized with a multi-fiber connector 38, is received by and connects to the multi-fiber adapter assembly 34, or the connector module, as the case may be, in the FDT 29 located at the distribution level 24, 26, 28. In this manner an optical connection is established between the riser cable 14 and the multi-fiber bundled drop cable 44. The multi-fiber bundled drop cable 44 routes to one or more drop boxes 46 associated with subscriber premises 48 located at the distribution level 24, 26, 28. One or more optical fibers separate from the multi-fiber bundled drop cable 44 at the drop box 46 and extends to the subscriber premises 48. In this manner, optical communication service is provided to the subscriber premises 48.

Figure 2:
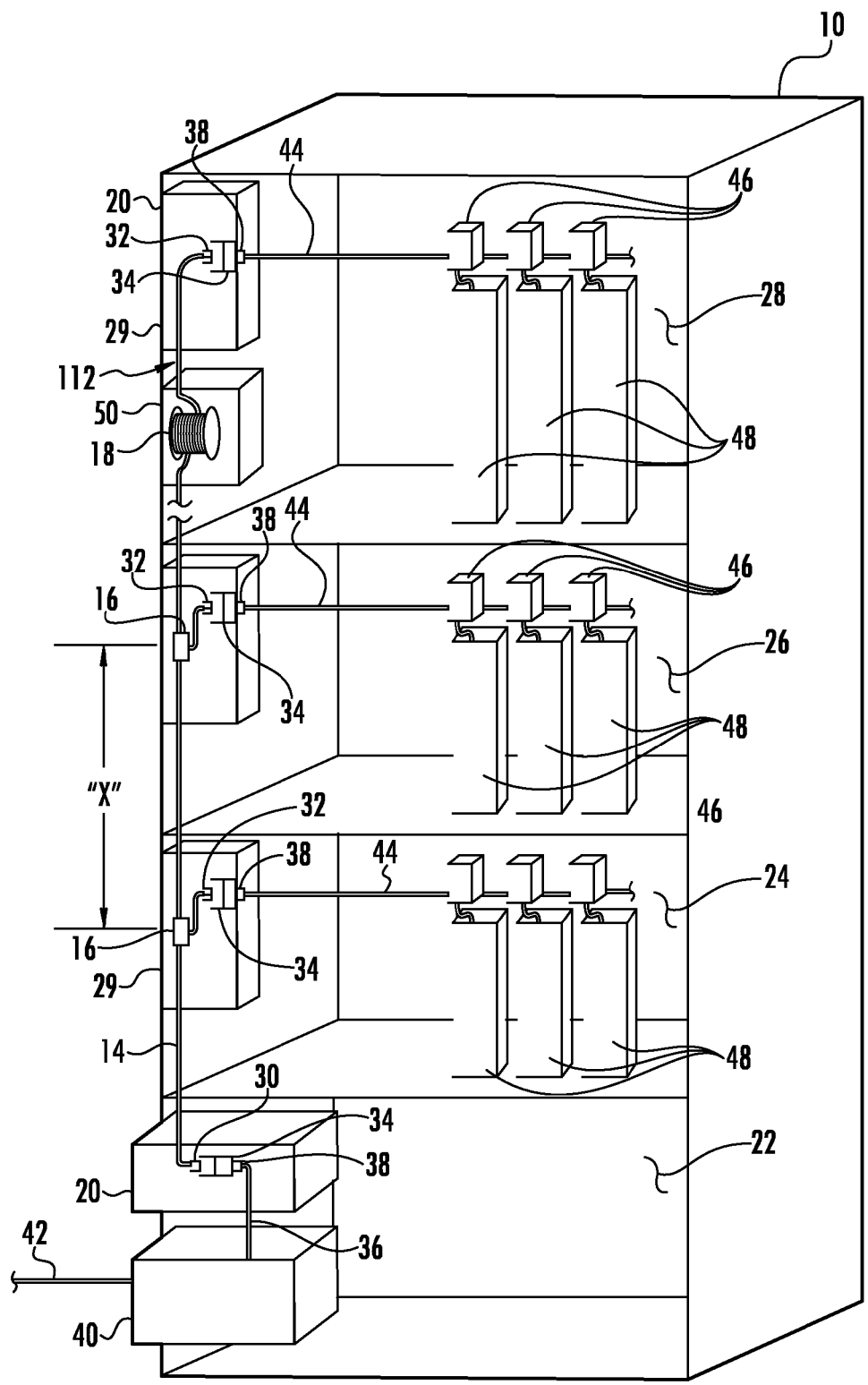
FIG. 2 is a schematic diagram of a perspective elevation view of a MDU with an exemplary fiber optic network installed therein, wherein a riser cable with pre-set tap points extends from a payout reel in a slack enclosure on a distribution level to other distribution levels and to a lower level.

FIG. 2 is a schematic diagram of a perspective elevation view the MDU 10 with an exemplary fiber optic network 112 installed therein. The riser cable 14 with pre-set mid-span access points 16 extends from a payout reel 18 in a separate slack enclosure 50 located at the highest distribution level 28 to the other distribution levels 24, 26 and the lower level 22. The aspects and/or components of the fiber optic network 112 described with respect to FIG. 1 will not be described again with respect to FIG. 2. In FIG. 2, after the riser cable 14 is paid out, the payout reel 18 is removably mounted in the slack enclosure 50 located at the highest level 28 instead of the patch panel enclosure 20. In this manner, during installation, the riser cable 14 pays out from the payout reel 18 such that the riser cable 14 extends generally in a downward direction from the highest distribution level 28 to each descending distribution level 24, 26 in succession, and to the patch panel enclosure 20.

The patch panel enclosure 20 includes a multi-fiber adapter assembly 34 but may not include the payout reel 18 since that is located at the highest distribution level 28 in fiber optic network 112. However, the multi-fiber-to-multi-fiber adapter assembly 34 in the patch panel enclosure 20 receives the first multi-fiber connector 30 and optically connects it with the with a multi-fiber connector 38 of the distribution cable 36 to establish an optical connection between the riser cable 14 and the distribution cable 36 as described above with respect to FIG. 1.

Figure 3:
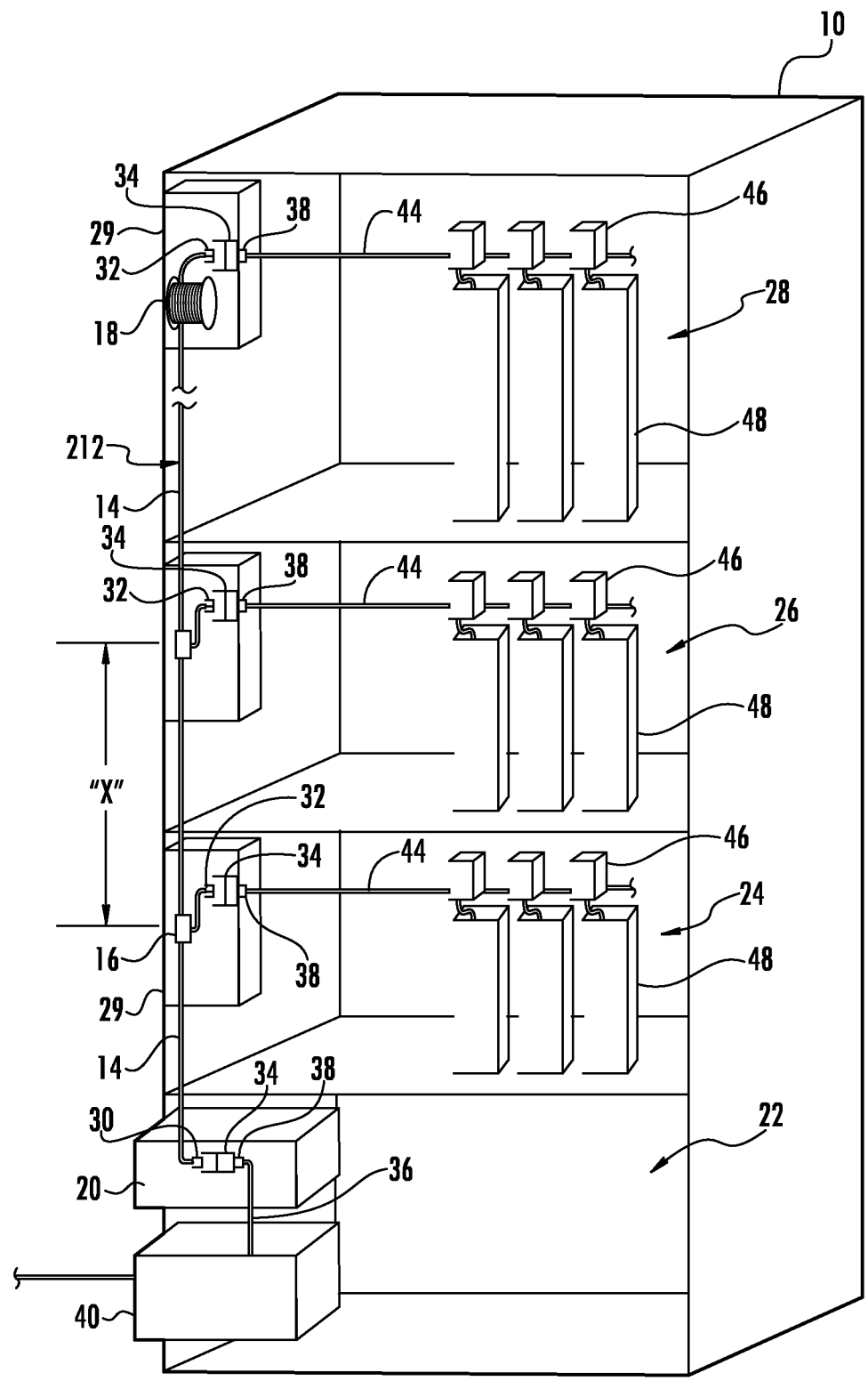
FIG. 3 is a schematic diagram of a perspective elevation view of a MDU with an exemplary fiber optic network installed therein, wherein a riser cable with pre-set tap points extends from a payout reel in a FDT on a distribution level to other distribution levels and the lower level.

FIG. 3 is a schematic diagram of a perspective elevation view of the MDU 10 with an exemplary fiber optic network 212 installed therein. The riser cable 14 with pre-set mid-span access points 16 extends from the payout reel 18 in the FDT 29 located at the highest distribution level 28 to the other distribution levels 24, 26. The aspects and/or components of the fiber optic network 212 described with respect to FIG. 1 and/or FIG. 2 will not be described again with respect to FIG. 3. In FIG. 3, after the riser cable 14 is paid out, the payout reel 18 is removably mounted in the FDT 29 located at the highest distribution level 28 instead of the slack enclosure 50, as described with respect to FIG. 2. In this way, the slack enclosure 50 is not needed at the highest distribution level 28 conserving space. The paying out and installation of the riser cable 14 may be the same as described with respect to FIG. 2.

Figure 4:
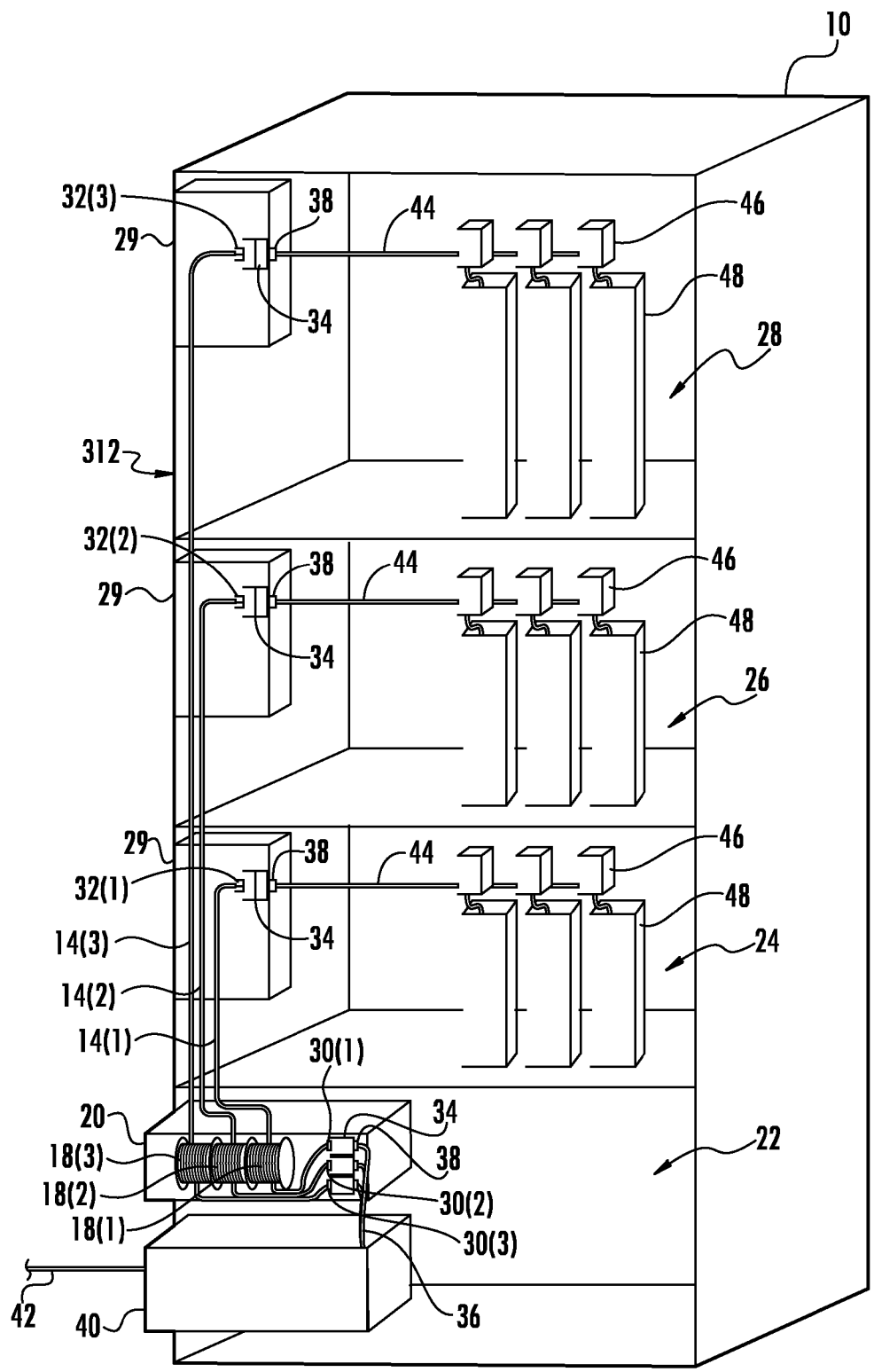
FIG. 4 is a schematic diagram of a perspective elevation view of a MDU with an exemplary fiber optic network installed therein, wherein a plurality of riser cables each extend from a separate payout reel in a patch panel enclosure located at the lower level to one of the distribution levels.

FIG. 4 is a schematic diagram of a perspective elevation view of the MDU 10 with an exemplary fiber optic network 312 installed therein. A plurality of riser cables 14(1), 14(2), 14(3) each extend from a separate payout reel 18(1), 18(2), 18(3) in the patch panel enclosure 20 to respective ones of the distribution levels 24, 26, 28. The aspects and/or components of the fiber optic network 312 described with respect to FIG. 1, FIG. 2 and/or FIG. 3 will not be described again with respect to FIG. 4. Each riser cable 14(1), 14(2), 14(3) pays out from respective payout reels 18(1), 18(2), 18(3). After the riser cable 14(1), 14(2), 14(3) is paid out, the respective payout reel 18(1), 18(2), 18(3) is removably mounted in the patch panel enclosure 20. The riser cables 14(1), 14(2), 14(3) extend generally in an upward direction from the lower level 22 to separate ascending distribution level 24, 26, 28. In this manner, a separate riser cable 14 provides optical service to a separate distribution level 24, 26, 28. Each of the riser cables 14(1), 14(2), 14(3) terminates with respective second multi-fiber connectors 32(1), 32(2), 32(3) which are received by and connected to the respective multi-fiber adapter assembly 34 in the FDT 29 located at the distribution levels 24, 26, 28. In the patch panel enclosure 20, the riser cables 14(1), 14(2), 14(3) extend from each of the payout reels 18(1), 18(2), 18(3) to the multi-fiber adapter assembly 34 located at the patch panel enclosure 20. The first multi-fiber connector 30(1), 30(2), 30(3) of each respective riser cable 14(1), 14(2), 14(3) is received by and connects to the multi-fiber adapter assembly 34 in the patch panel enclosure 20. The distribution cable 36 preconnectorized with a multi-fiber connector 38, is received by and connects to the multi-fiber adapter assembly 34 in the patch panel enclosure 20 to establish an optical connection between the riser cables 14(1), 14(2), 14(3) and the distribution cable 36. The distribution cable 36 routes to a local convergence point (LCP) 40.

Figure 5:
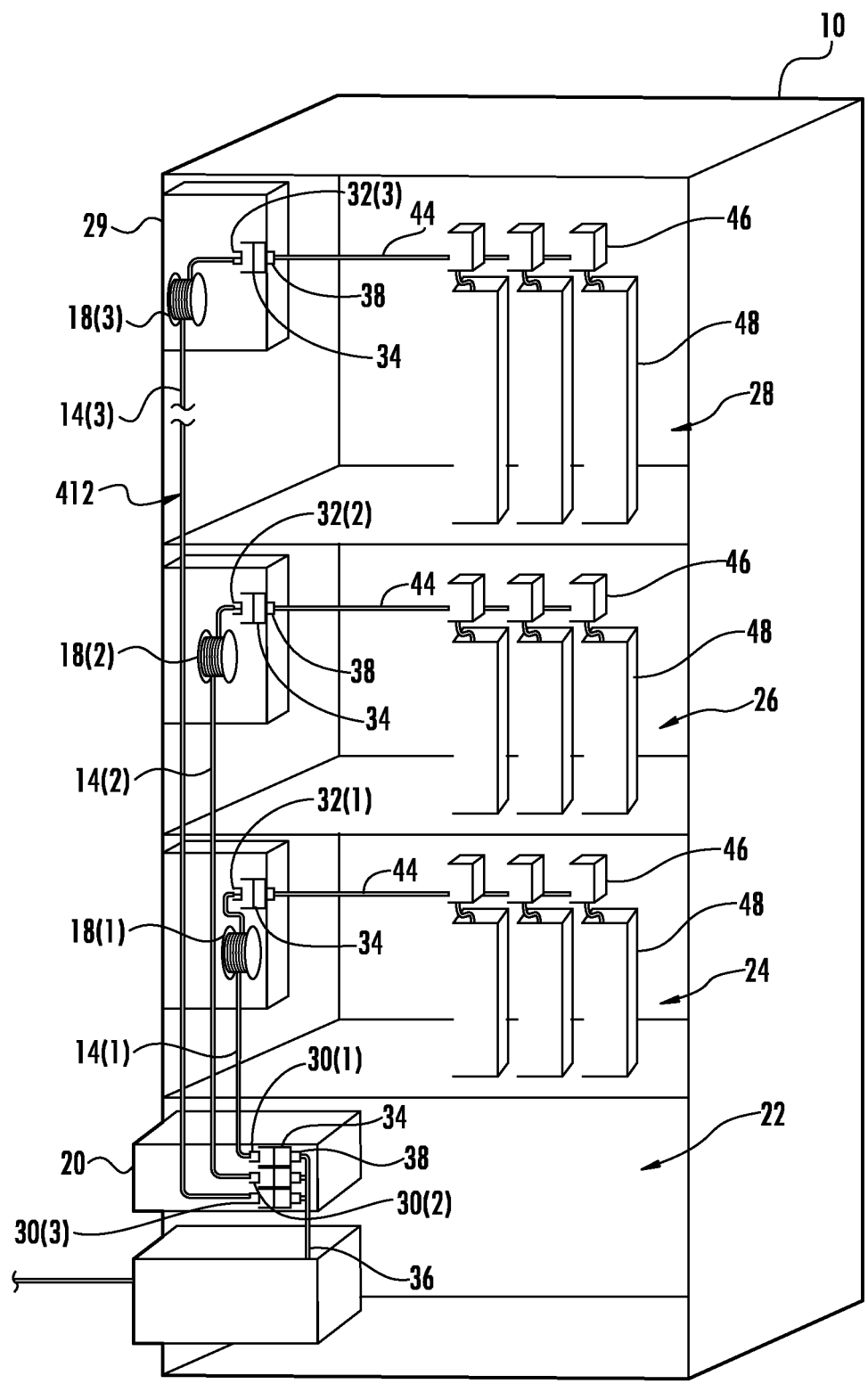
FIG. 5 is a schematic diagram of a perspective elevation view of a MDU with an exemplary fiber optic network installed therein, wherein a plurality of riser cables each extend from a separate FDTs each located at one of the distribution levels to the patch panel enclosure located at the lower level.

FIG. 5 is a schematic diagram of a perspective elevation view of the MDU 10 with an exemplary fiber optic network 412 installed therein. The plurality of riser cables 14(1), 14(2), 14(3) each extend from separate, respective FDTs 29 located at one of the distribution levels 24, 26, 28 to the patch panel enclosure 20. The aspects and/or components of the fiber optic network 312 described with respect to FIG. 1, FIG. 2, FIG. 3 and/or FIG. 4 will not be described again with respect to FIG. 5. Each riser cable 14(1), 14(2), 14(3) pays out from respective payout reels 18(1), 18(2), 18(3). After the necessary length of riser cable 14(1), 14(2), 14(3) is paid out, the payout reel 18(1), 18(2), 18(3) is removably mounted in separate, respective FDTS 29 located at respective distribution levels 24, 26, 28. The riser cables 14(1), 14(2), 14(3) extend generally in a downward direction from the respective FDTs 29 located at respective distribution levels 24, 26, 28 to the lower level 22. In this manner, a separate riser cable 14 provides optical service to a separate distribution level 24, 26, 28. Each of the riser cables 14(1), 14(2), 14(3) terminates with respective second multi-fiber connectors 32(1), 32(2), 32(3) which are received by and connected to the respective multi-fiber adapter assembly 34 in the FDT 29 located at the distribution levels 24, 26, 28. In the patch panel enclosure 20, the first multi-fiber connector 30(1), 30(2), 30(3) of each respective riser cable 14(1), 14(2), 14(3) is received by and connects to the multi-fiber adapter assembly 34 in the patch panel enclosure 20. The distribution cable 36 preconnectorized with a multi-fiber connector 38, is received by and connects to the multi-fiber adapter assembly 34 in the patch panel enclosure 20 to establish an optical connection between the riser cables 14(1), 14(2), 14(3) and the distribution cable 36. The distribution cable 36 routes to the LCP 40.

Figure 6:
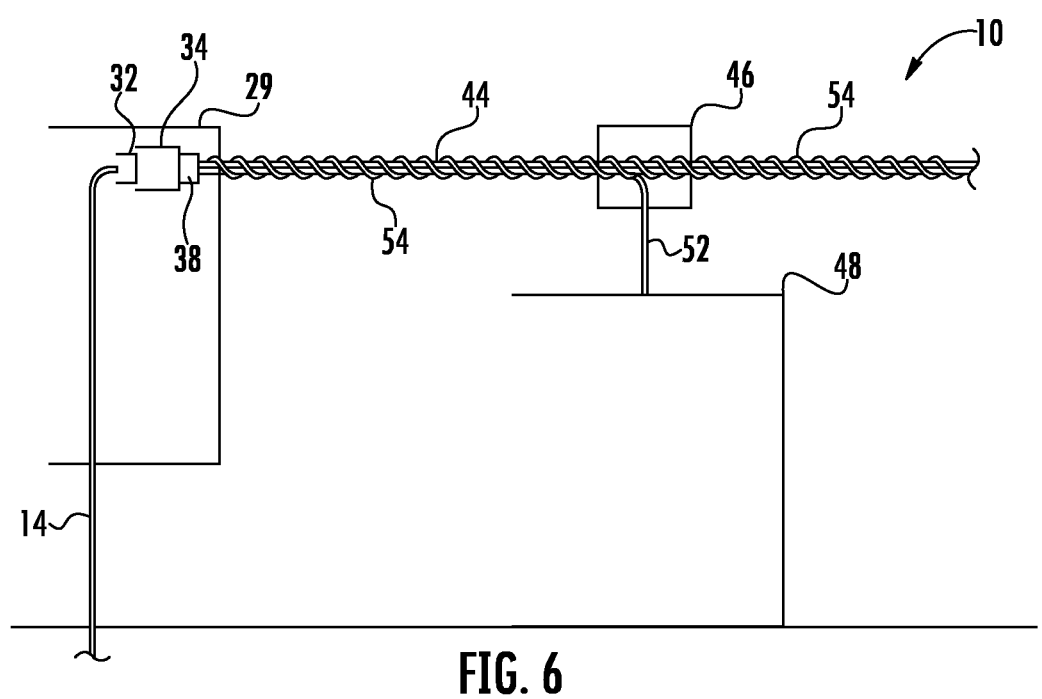
FIG. 6 is a schematic diagram of a bundled drop cable extending from a FDT to a subscriber premises located on a distribution level of the MDU.

Referring now to FIG. 6, the portion of the fiber optic networks 12, 112, 212, 312, 412 at the distribution level 24, 26, 28 is illustrated. The multi-fiber bundled drop cable 44 extends from the FDT 29 at the distribution level 24, 26, 28 to drop box 46 associated with the and located at the subscriber premises 48. The multi-fiber bundled drop cable 44 includes multiple fiber optic cables 52 retained together by one or more helically wrapped external binders 54. One or more of the multiple fiber optic cables is separated from the multi-fiber bundled drop cable 44 by removing the multiple fiber optic cable from the retainage of the one or more external binders. The separated fiber optic cable 52 may then extend to the subscriber premises 48.

FIG. 7 is a schematic diagram of an elevation view of an exemplary preconnectorized riser installation assembly 56 with a plurality of preconnectorized riser cables 14(1), 14(2), 14(3) being extended from respective payout reels 18(1), 18(2), 18(3) located at a lower level 22 by a leader 58 with extending features 60 attached to the leader 58 at preset locations at a distance "Y" along the length of the leader 58. The extending feature 60 may be any type of loop, hook, swivel, or the like, configured to attach to the second multi-fiber connectors 32(1), 32(2), 32(3), or to some type of pull device attached to the second multi-fiber connectors 32(1), 32(2), 32(3) to provide for safely and effectively paying out the riser cables 14(1), 14(2), 14(3).

FIG. 7A is a detail view of a pull device assembly 62 which may be attached to the end of the riser cable 14 to facilitate extending the riser cable 14 from the payout reel 18. The pull device assembly 62 attaches to the riser cable 14 using extending feature 60. The pull device assembly 62 may enclose the second multi-fiber connector 32, boot of the second multi-fiber connector 32 and a portion of the riser cable 14. The pull device assembly 62 has a swivel end 64 and a body 66. The body 66 may enclose and/or support the second multi-fiber connectors 32. The swivel end 64 is allowed to rotate freely and independently of the body 66 and, therefore, the second multi-fiber connector 32 and the riser cable 14. The swivel end 64 comprises a hole through which the extending feature 60 inserts. As the riser cable 14 is pulled through the MDU 10 particularly in conduit using a pull loop 68 attached to the end of the leader 58, and the extending feature 60 attached to the swivel end 64, the swivel end 64 it is allowed to independently rotate from the rest of the pull device assembly 62. This independent rotation eliminates twisting of the riser cable 14 and the second multi-fiber connector 32. In this manner, as the leader 58 is pulled through the MDU 10 particularly in conduit, the leader 58, the extending feature 60 and the swivel end 64 reduce or may eliminate any induced additional torsional stresses on the riser cable 14 and/or the second multi-fiber connector 32.

Referring again to FIG. 7, the distance "Y" is preset to a certain value depending on the distance between adjoining distribution levels 24, 26, 28. As examples, the distance "Y" may be set at 10 feet, 12 feet, 14 feet, 15 feet, and the like. In this manner, as the leader 58 is pulled through the MDU 10, riser cables 14(1), 14(2), 14(3) each pays out to a point that will align, generally, with each respective distribution level 24, 26, 28 of the MDU 10. Any riser cable 14 slack due to the presetting of the distance "Y" or otherwise, may be stored on the respective payout reel 18(1), 18(2), 18(3) and/or loosely in an patch panel enclosure 20 and/or a slack enclosure (not shown in FIG. 7). Additionally, slack may be stored loosely, on the payout reels 18(1), 18(2), 18(3) and/or the FDT 29 at one or more of the distribution levels 24, 26, 28. Each second multi-fiber connectors 32(1), 32(2), 32(3), may then be connected to the respective multi-fiber adapter assembly 34 removably mounted in the FDT 29 located at the respective distribution level 24, 26, 28. Additionally, the first multi-fiber connectors 30(1), 30(2), 30(3) attached to respective riser cables 14(1), 14(2), 14(3) may be connected to the respective multi-fiber adapter assembly 34 removably mounted in the patch panel enclosure 20.

Figure 8:
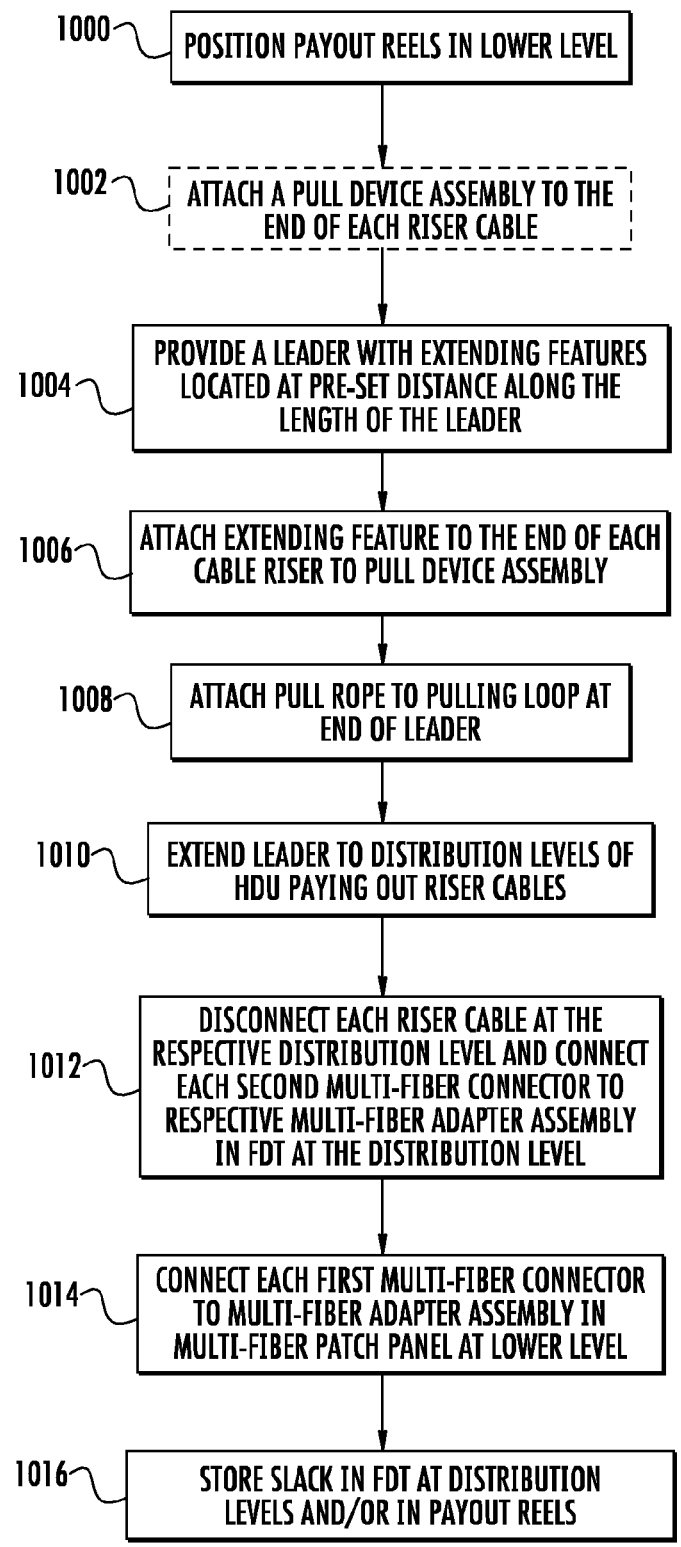
FIG. 8 is a flowchart illustrating a method of installing a plurality of preconnectorized riser cables from payout reels located at a lower level to FDTs located at distribution levels, according to an exemplary embodiment.

FIG. 8 is a flowchart illustrating a method of installing a plurality of preconnectorized riser cables 14(1), 14(2), 14(3), from payout reels 18(1), 18(2), 18(3) located at a lower level 22 to FDTs 29 located at upper levels 24, 26, 28 according to an exemplary embodiment. The payout reels 14(1), 14(2), 14(3) are positioned in the lower level 22 (Step 1000). Optionally, a pull device assembly 62 may be attached to the end of each riser cable 14(1), 14(2), 14(3) (Step 1002). A leader 58 with extending features 60 located at the pre-set distance "Y" along the length of the leader 58 is provided (Step 1004). The extending features 60 are attached to the end of each riser cable 14(1), 14(2), 14(3), particularly to each pull device assembly 62 if such is provided (Step 1006). A pull rope is attached to the end of the leader 58 through a pull loop 68 (Step 1008) and, using the pull rope, the leader 58 is pulled to the distribution levels 24, 26, 28 of the MDU 10 in an ascending order paying out the riser cables 14(1), 14(2), 14(3) from the respective payout reels 18(1), 18(2), 18(3) (Step 1010). At each successive distribution level 24, 26, 28 in the ascending order, the leader 58 is accessed and the appropriate riser cable 14(1), 14(2), 14(3) for that distribution level 24, 26, 28 is extended. The appropriate riser cable 14(1), 14(2), 14(3) is disconnected from the extending feature 60 and the second multi-fiber connector 32(1), 32(2), 32(3) to the respective multi-fiber adapter assembly 34 in the FDT 29 at the distribution level 24, 26, 28 (Step 1012). The first multi-fiber connectors 30(1), 30(2), 30(3) may be connected to the multi-fiber adapter assembly 34 located in the patch panel enclosure 20 (Step 1014). Riser cable 14 slack may be stored in the FDT 29 at the distribution level 24, 26, 28 and/or in the payout reels 18(1), 18(2), 18(3) (Step 1016). The payout reels 18(1), 18(2), 18(3) may be removably mounted in the patch panel enclosure 20.

Figure 9:
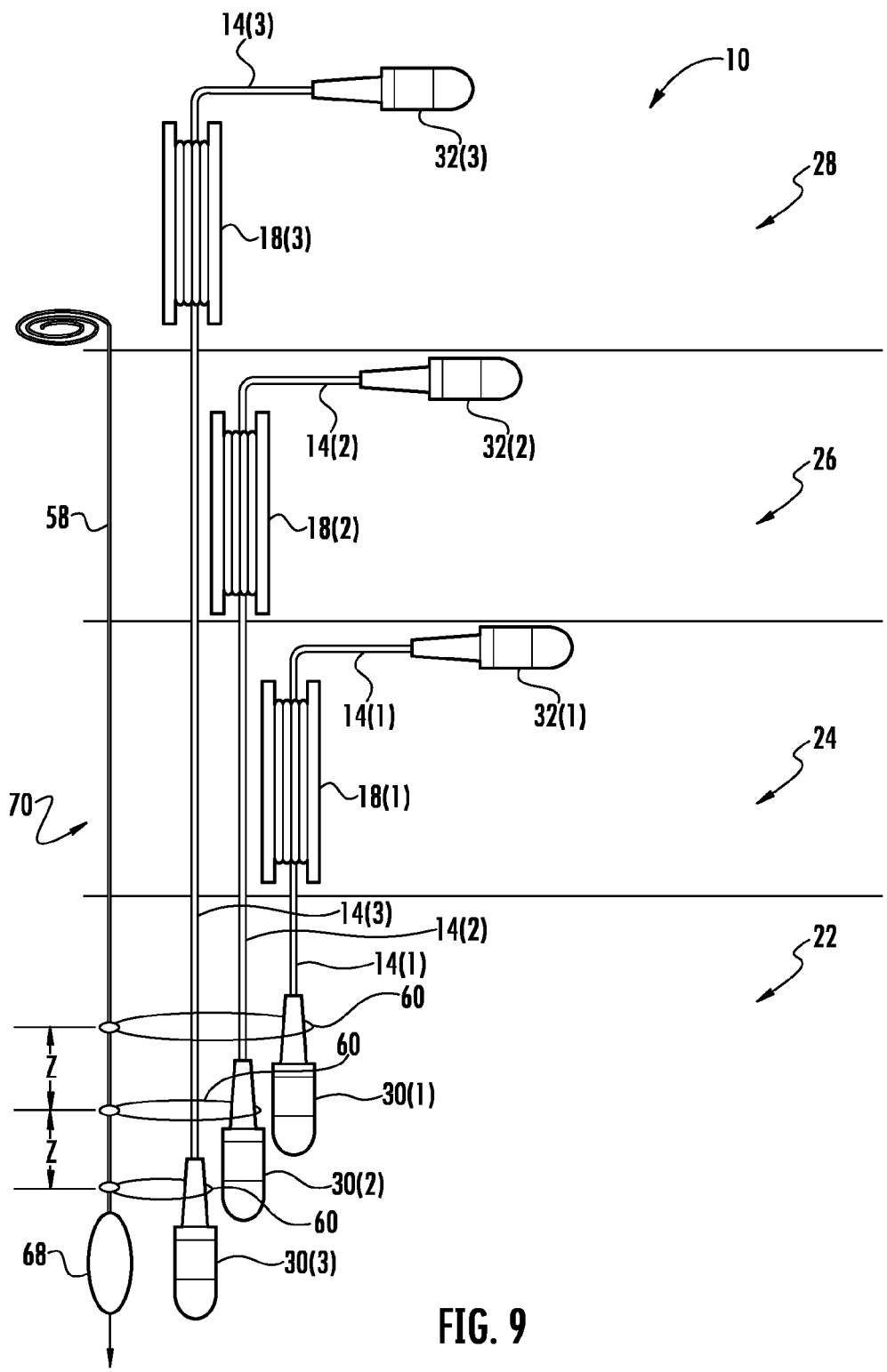
FIG. 9 is a schematic diagram of an elevation view of an exemplary preconnectorized riser cable installation assembly with a plurality of preconnectorized risers being extended from payout reels located at distribution levels by a leader with extending features attached to the leader at preset locations.

FIG. 9 is a schematic diagram of an elevation view of an exemplary preconnectorized riser installation assembly 70 with a plurality of preconnectorized riser cables 14(1), 14(2), 14(3) being extended from payout reels 18(1), 18(2), 18(3) each located at respective distribution levels 24, 26, 28 of the MDU 10 using pull loop 68. The riser cables 14(1), 14(2), 14(3) may be payed out by using a leader 58 with extending features 60 attached to the leader 58 at preset locations at a distance "Z" along the length of the leader 58. The extending feature 60 may be any type of loop, hook, swivel, or the like, configured to attach to the first multi-fiber connectors 30(1), 30(2), 30(3), or to some type of pull device attached to the first multi-fiber connectors 30(1), 30(2), 30(3) to provide for safely and effectively paying out the riser cables 14(1), 14(2), 14(3). The pull device assembly 66 described with respect to FIG. 7A, above, may be attached to the end of the riser cables 14(1), 14(2), 14(3) to facilitate extending the riser cables 14(1), 14(2), 14(3) from the payout reels 18(1), 18(2), 18(3).

The distance "Z" is preset to a value, as a nonlimiting example, 6 inches, to allow the leader 58 to be accessed at each succeeding distribution level 24, 26, 28 in descending order to attach extending feature 60 to the particular riser cable 14(1), 14(2), 14(3). In other words, the riser cable 14(3) for the highest distribution level 28 is attached to the leader first. Then the riser cable 14(2) for then next lower distribution level 26 is attached to the leader 58. Then the riser cable 14(1) for the next lower distribution level 24 is attached to the leader 58. The leader 58 extends to the lower level 22. Any riser cable 14 slack may be stored on the respective payout reel 18(1), 18(2), 18(3) and/or loosely in the FDT 29 and/or a slack enclosure (not shown in FIG. 9) at the distribution level 24, 26, 28. Additionally, slack may be stored in the patch panel enclosure 20. Each second multi-fiber connectors 32(1), 32(2), 32(3), may be connected to the respective multi-fiber adapter assembly 34 removably mounted in the FDT 29 located at the respective distribution level 24, 26, 28. Additionally, the first multi-fiber connectors 30(1), 30(2), 30(3) attached to respective riser cables 14(1), 14(2), 14(3) may be connected to the respective multi-fiber adapter assembly 34 removably mounted in the patch panel enclosure 20.

Figure 10:
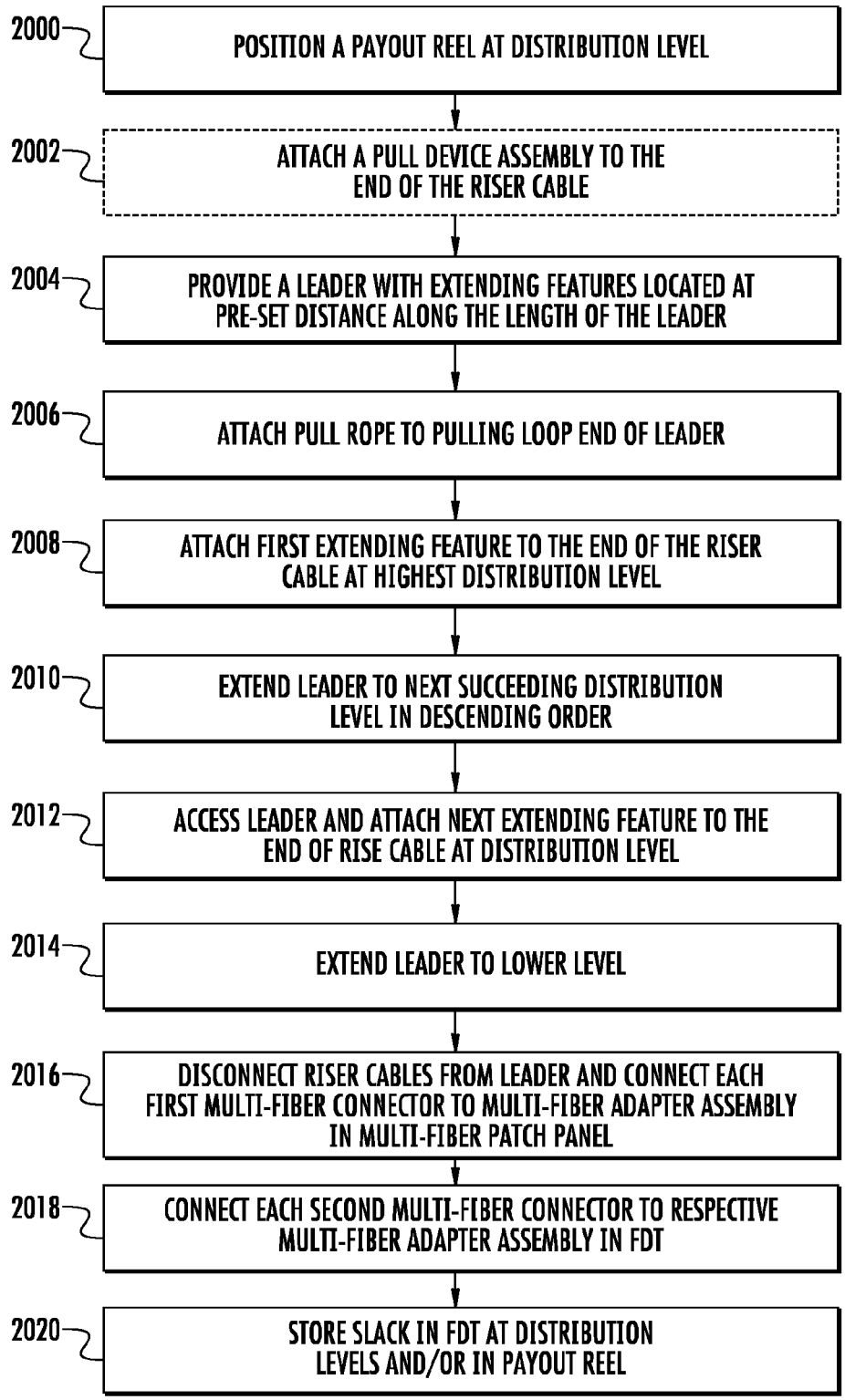
FIG. 10 is a flowchart illustrating a method of installing a plurality of preconnectorized riser cables from payout reels located at distribution levels to a patch panel enclosure located at the lower level, according to an exemplary embodiment.

FIG. 10 is a flowchart illustrating a method of installing a plurality of preconnectorized riser cables 14(1), 14(2), 14(3) from payout reels 18(1), 18(2), 18(3) located at distribution levels 24, 26, 28 of MDU 10 to the patch panel enclosure 20, according to an exemplary embodiment. The payout reels 14(1), 14(2), 14(3) are each positioned at respective distribution levels 24, 26, 28 (Step 2000). Optionally, a pull device assembly 62 may be attached to the end of each riser cable 14(1), 14(2), 14(3) (Step 2002). A leader 58 with extending features 60 located at the pre-set distance "Z" along the length of the leader 58 is provided (Step 2004). A pull rope is attached to the pulling loop 68 at the end of the leader 58 (Step 2006). One of the extending features 60, which may be the first extending feature 60 closest to the pulling loop 68 is attached to the riser cable 14(3) from the payout reel 18(3) located at the highest distribution level 28 in the MDU 10 (Step 2008). The leader 58 is extended to the next succeeding distribution level 26, 24 in descending order (Step 2010). At the next succeeding distribution level 26, 24, the leader 58 is accessed and the next extending feature 60 is attached to the end of that riser cable 14(2), 14(3) (Step 2012). The leader 58 is extended to the distribution levels and the riser cable attached in the same manner. The leader 58 is extended to the lower level 22 (Step 2014). The riser cables 14(1), 14(2), 14(3) are disconnected from the leader 58 and each first multi-fiber connector 30(1), 30(2), 30(3) is connected to the multi-fiber adapter assembly 34 in the patch panel 20 enclosure (Step 2016). Each second multi-fiber connector 32(1), 32(2), 32(3) is connected to respective multi-fiber adapter assemblies 34 in the FDT 29 located at the distribution levels 24, 26, 28 (Step 2018). Riser cable 14 slack may be stored in the FDT 29 at the distribution level 24, 26, 28 and/or in the payout reels 18(1), 18(2), 18(3) (Step 2020). The payout reels 18(1), 18(2), 18(3) may be removably mounted in the FDT 29. Slack may also be stored in the patch panel enclosure 20.

FIG. 11 is a schematic diagram of a front, perspective view of an exemplary LCP 40 for use with a fiber optic network in a MDU 10. The LCP 40 comprises an enclosure 72 with a door 74 hingedly attached to the enclosure 72. The door 74 closes to restrict and/or prohibit access to the interior 76 of the enclosure 72 and the components mounted therein, and opens to allow access to the interior 76 and the components mounted therein. A swingable adapter panel 78 mounts in the interior 76. The adapter panel 78 has a first side 80 (not visible in FIG. 11) and a second side 82 to provide connections of optical fibers 83, 85 between a feeder side and a distribution side. Pivot points 96 positioned at the top and bottom of the interior 76 allow the adapter panel to swing to provide access to the first side 80 or the second side 82 depending on the positioning of the adapter panel 78. Additionally, the adapter panel is lockable in one or more positions. The adapter panel 78 splits the interior 76 into a first section 84 and a second section 86. The LCP 40 is flexible such that either or both the first section 84 or the second section 86 can be configured to support feeder side optical fiber 83 management and/or connections, and/or distribution side optical fiber 85 management and/or connections.

The adapter panel 78 has a connection field 88 that supports multi-fiber adapters and connections, single fiber adapters and connections as well as pass-through adapters and connection. In FIG. 11, the feeder cable 42 is shown as entering the LCP 40 at the bottom into the first section 84 and connecting to splice trays 92. A continuing section 42(1) of the feeder cable 42 extends from the bottom of the second side 86 to further provide optical connection from the service provider to other areas of the MDU 10 and/or to other MDU's and/or facilities. The distribution cable 36 extends from the top of the first section 84. The distribution cable 36 optically connects to one or more riser cables 14, which may be through a multi-fiber adapter assembly 34 in a patch panel housing 20. One or more splitters 94 may also be mounted in the LCP 40 to split the optical signal carried by the feeder cable 42 into multiple optical signals for distribution. Fiber routing guides 98 and fiber management guides 100 may also be mounted in the first section 84 and/or the second section 86.

Figure 11A:
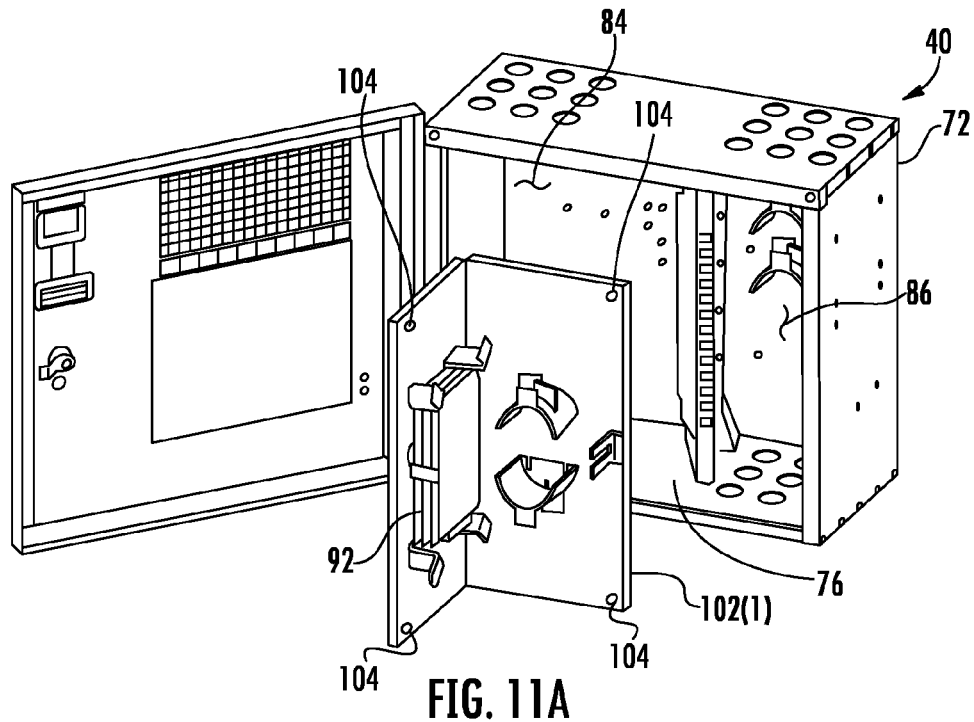
FIG. 11A is a schematic diagram of a front, perspective exploded view of the LCP of FIG. 11 having an interior panel removably mountable in the LCP, wherein the interior panel is configured to support optical fiber in a first section of the LCP.
Figure 11B:
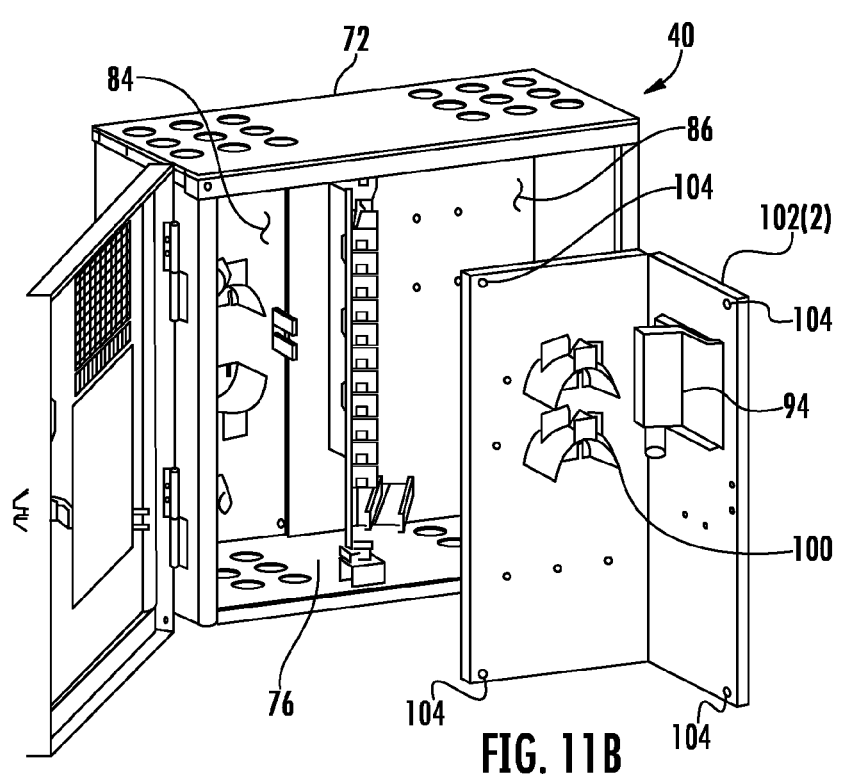
FIG. 11B is a schematic diagram of a front, perspective exploded view of the LCP of FIG. 11 having an interior panel removably mountable in the LCP, wherein the interior panel is configured to support optical fiber splitting in the second section of the LCP.
Figure 11C:
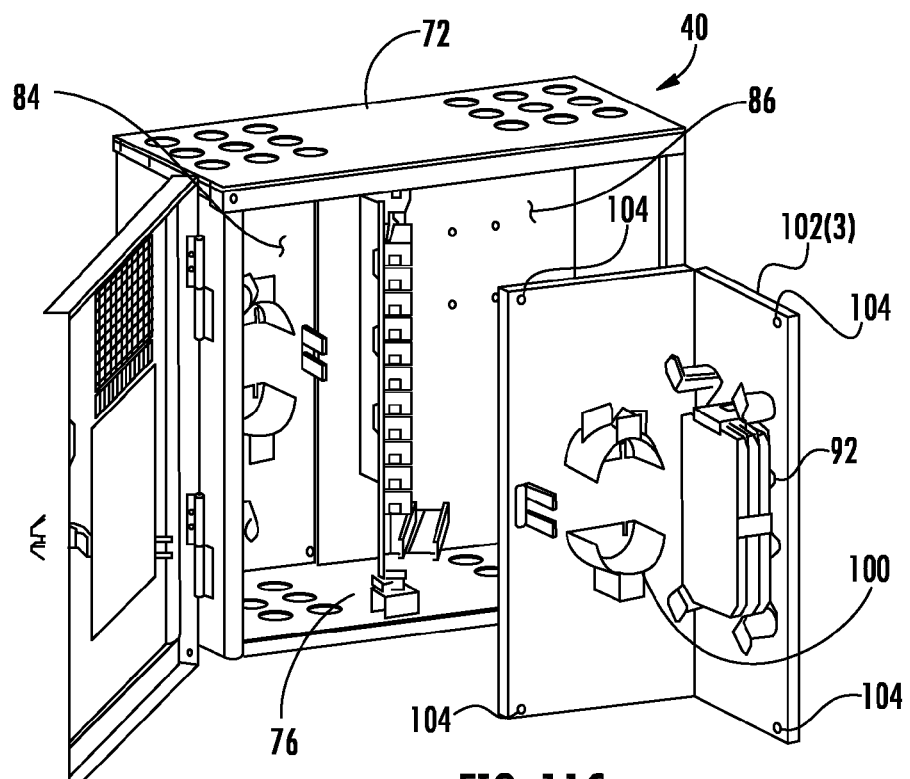
FIG. 11C is a schematic diagram of a front, perspective exploded view of the LCP of FIG. 11 having an interior panel removably mountable in the LCP, wherein the interior panel is configured to support optical fiber splicing in the second section of the LCP.

FIGS. 11A, 11B and 11C are schematic diagrams of front, perspective, exploded views of the LCP 40 illustrating interior panels 102(1), 102(2), 102(3) which may be used in the LCP 40. The interior panels 102(1), 102(2), 102(3) are interchangeable and allow the LCP 40 enclosure 72 to be easily reconfigured at the factory or in the field. This allows the enclosure 72 to be configured and reconfigured to support multiple applications and changing subscriber situations. In this manner, the interior panels 102(1), 102(2), 102(3) can support, without limitation, fiber splicing, multiple splitter form factors, cable entries and other various modifications or arrangements of the LCP 40. Additionally, the interior panels 102(1), 102(2), 102(3) can be installed on the either the first section 84 or second section 86 of the interior 76 using any type of fasteners 104, such as, without limitation, screws, latches and the like allowing for removable attachment.

In this regard, FIG. 11A illustrates an interior panel 102(1) removably mountable to the enclosure 72 in the interior 76 in the first section 84 configured to support optical fiber splicing having splice trays 92 and optical fiber management guides 100. FIG. 11B illustrates an interior panel 102(2) removably mountable to the enclosure 72 in the interior 76 in the second section 86 configured to support optical fiber splitting having splitters 94 and optical fiber management guides 100. FIG. 11C illustrates an interior panel 102(2) removably mountable to the enclosure 72 in the interior 76 in the second section 86 configured to support optical fiber splicing having splice trays 92 and optical fiber management guides 100. Similarly, although not shown, an interior panel 102 removably mountable to the enclosure 72 in the interior 76 in the first section 84 may be configured to support optical fiber splitting having splitters 94 and optical fiber management guides 100. Additionally or alternatively, the interior panels 102 may be configured to support any type of function or component, as examples, without limitation, furcation devices, ribbon fan-out bodies, wave division multiplexing, coarse wave division multiplexing and others.

The LCP 40 provides for a smaller form factor while allow a high density of optical fiber connections for distribution of optical service to the MDU 10. Additionally, the LCP 40 allows for various options for feeder and distribution cables and of multiple splitters including, without limitation, at least five 1×32 splitters. The LCP 40 can also function as a demarcation point providing 1×1 input to output connections.

FIG. 12 is a schematic diagram of front, elevation views of an exemplary patch panel enclosure 20 with a multi-fiber adapter assembly 34 and multiple payout reels 18 removably mounted therein. The patch panel enclosure 20 has a door 106 hingedly attached thereto. The door 106 closes to restrict and/or prohibit access to the interior 107 of the patch panel enclosure 20 and the components mounted therein, and opens to allow access to the interior 107 and the components mounted therein. In FIG. 12, a multi-fiber adapter assembly 34 and multiple payout reels 18(1), 18(2), 18(3), 18(4), are shown mounted in the interior 107. The riser cables 14(1), 14(2), 14(2), 14(2) are shown as having been paid out from the payout reels 18(1), 18(2), 18(3), 18(4) which are now being used to store riser cable 14(1), 14(2), 14(2), 14(2) slack. In FIG. 12, the payout reels 18(1), 18(2), 18(3), 18(4) are shown in a collapsed state. The payout reels 18(1), 18(2), 18(3), 18(4) are shown as being collapsible being collapsed to a smaller form factor allowing for storing in the patch panel enclosure 20. The first multi-fiber connectors 30(1), 30(2), 30(3), 30(4) route and connect to one side of the with the multi-fiber adapter assembly 34. The distribution cable 36 connects to the other end of the multi-fiber adapter assembly 34 and extends from the bottom of the patch panel enclosure 20. Mounting holes 108 allow the patch panel enclosure 20 to be wall mounted.

FIG. 13 is a schematic diagram of a front, perspective view of a FDT 129 having a payout reel 18 and an adapter module assembly 110 with an adapter module 112 and a multi-fiber adapter assembly 34 removably mounted therein. In the embodiment depicted in FIG. 13, the FDT 129 is configured to be mounted in-line with and supported by conduit 113 carrying the riser cable 14 and may be mounted at one or more distribution levels 24, 26, 28. The FDT 129 has an enclosure 114 with a door 116 hingedly attached thereto. The door 116 closes to restrict and/or prohibit access to the interior 118 of the FDT 129 and the components mounted therein, and opens to allow access to the interior 118 and the components mounted therein. In FIG. 13, the adapter module assembly 110 is shown mounted to the door 116 in the interior 118. The adapter module assembly 110 comprises a connector panel 120 to which the adapter module 112 and the multi-fiber adapter assembly 34 attach. The multi-fiber adapter assembly 34 has multi-fiber adapters 122 and multiple single fiber adapters 124. In this manner, the adapter module assembly 110 can receive and connect the riser cable 14 to drop cables 44 extending to subscriber premises 48 located on the distribution levels 24, 26, 28.

Routing guides 126 to route and manage fiber optic cables mount to the door 116 in the interior 118 in addition to the adapter module assembly 110. The door 116 has a flange 128 having a tool lock mechanism 130 and a pad lock hole 132. A flange 134 on the enclosure 114 has a tool lock receiver 136 and pad lock hole 138, which mate with the tool lock mechanism 130 and a pad lock hole 132 when the door 116 is closed to provide for locking the FDT 129. The riser cable 14 is shown as having been paid out from the payout reel 18 which is now being used to store riser cable 14 slack. The payout reel 18 is shown in the collapsed state in a smaller form factor allowing for storing in the FDT 129.

FIG. 14 is a schematic diagram of a front, perspective view of an exemplary FDT 229 having a payout reel 18 removably mounted therein and an adapter module assembly 210 pivotably mounted therein. The FDT 229 has an enclosure 214 with a door 216 hingedly attached thereto, and may be located at one or more distribution levels 24, 26, 28. The door 216 closes to restrict and/or prohibit access to the interior 218 of the FDT 229 and the components mounted therein, and opens to allow access to the interior 218 and the components mounted therein. The adapter module assembly 210 has a cradle 236 adapted to removably hold one or more adapter modules 112. The cradle 236 has a slack storage area 238 for storing the slack of drop cables 44 extending to subscriber premises 48 located at the distribution level 24, 26, 28. A routing guide 240 connecting to and extending from the cradle provides for drop cable 44 routing and management in the FDT 229. One or more mounting ears 142 extend from the enclosure 214 allowing the enclosure 214 to be mounted to a wall, for example in a closet, at the distribution level 24, 26, 28. The door 216 has a flange 228 having a tool lock mechanism 130 and a pad lock hole 132. A flange 234 on the enclosure 214 has a tool lock receiver 136 and pad lock hole 138, which mate with the tool lock mechanism 130 and a pad lock hole 132 when the door 116 is closed to provide for locking the FDT 229. The riser cable 14 is shown as having been paid out from the payout reel 18 which is now being used to store riser cable 14 slack. The payout reel 18 is shown as being collapsible being collapsed to a smaller form factor allowing for storing in the FDT 229.

FIG. 15 is a schematic diagram of the front, perspective view of the FDT 229 with the adapter module assembly 210 pivoted to an open position. The adapter module assembly 210 has a pivot assembly 144 connected to the bottom of the enclosure 214. In FIG. 15, the pivot assembly 144 is illustrated as a cradle bracket 146 and a cradle hinge 148. However, the pivot assembly 144 can be any mechanical or structural design that allows the adapter module assembly 210 to pivot. Sealing feature 150 allows the riser cable 14 and drop cables 44 to enter the enclosure 214 while maintaining the FDT 229 in an environmentally sealed condition. One or more strain relief brackets 152 provide strain relief for the riser cable 14 and drop cables 44 in the FDT 229.

Referring now to FIGS. 16 to 28 there is illustrated exemplary embodiments of a collapsible cable reel. The collapsible cable reel comprising a frame assembly with a first end and a second end and at least one cable support. A first end assembly releasably connects to the first end of the frame assembly and a second end assembly releasably connects to the second end of the frame assembly. The at least one cable support extends from the frame assembly to the first end assembly and is adapted to support a length of cable wound around the collapsible cable reel. The length of the at least one cable support is shortenable allowing the first end assembly to move closer to the second end assembly and the collapsible cable reel to move from a first position to a second position.

The first position of the collapsible cable reel may be an uncollapsed state, while the second position of the collapsible cable reel may be a collapsed state. The frame assembly may comprise a center member having a frame hub and an extension member. The center member may be shortenable in length by removing the extension member allowing the first end assembly to move closer to the second end assembly and the collapsible cable reel to move from a first position to a second position. Alternatively or additionally, the center member may comprise a telescoping extension member, with the center member being shortenable by reducing the length of the telescoping extension member.

The frame assembly may comprise at least one frame arm extending radially from the frame hub. The first end assembly may comprise at least one first end arm extending radially from the first end hub, and the second end assembly may comprise at least one second end arm extending radially from the second end hub. Alternatively or additionally, the frame assembly may comprise a frame disk connected to the frame hub. The first end assembly may comprise a first disk connected to the first end hub, and the second end assembly may comprise a second disk connected to the second end hub.

The collapsible cable reel may have at least 100 feet of cable wound on it. The cable may be fiber optic cable, such as without limitation, riser cable or drop cable for a multiple dwelling unit. The collapsible cable reel is adapted to store cable slack in at least one of the first position and second position. The collapsible cable reel may be removably mountable in an enclosure, in one or both of the first position and the second position.

A method of operating a collapsible cable reel is also disclosed. The method may comprise providing a collapsible cable reel having a first end and a second end on which cable is wound. The first end and the second end separated by a distance, paying out at least a portion of the cable, retaining remaining slack of the cable not payed out on the collapsible cable reel, and collapsing the collapsible cable reel by reducing the distance between the first end and the second end. The method may also include removably mounting the collapsed collapsible cable reel with the retained remaining slack of the cable in an enclosure. The cable may be fiber optic cable. The fiber optic cable may be riser cable or drop cable, used in a multiple dwelling unit.

The collapsible cable reel of the method may comprise a frame assembly having with a first end and a second end and at least one cable support, a first end assembly connected to the first end of the frame assembly, and a second end assembly connected to the second end of the frame assembly. At least one cable support may extend from the frame assembly to the first end assembly and is adapted to support a length of cable wound around the collapsible cable reel. The method may include shortening at least one cable supports to allow the first end assembly to move closer to the second end assembly and the collapsible cable reel to move from a first position to a second position.

A method may include providing a frame assembly having with a first end and a second end and a plurality of cable supports, a first end assembly connected to the first end of the frame assembly and a second end assembly connected to the second end of the frame assembly. A plurality of cable supports extends from the frame assembly to the first end assembly and is adapted to support a length of cable wound around the collapsible cable reel. The length of the plurality of cable supports is shortenable. The method may also include paying out at least a portion of the length of cable, retaining remaining slack of the cable not payed out on the cable supports, and shortening a length of each of the plurality of cable supports allowing the first end assembly to move closer to the second end assembly and the collapsible cable reel to move from a first position to a second position. The length of cable wound on the cable supports is at least 100 feet. The cable is fiber optic cable. The fiber optic cable is one of riser cable and drop cable, used in a multiple dwelling unit. The method may also include removably mounting the collapsible cable reel in an enclosure.

Figure 16:
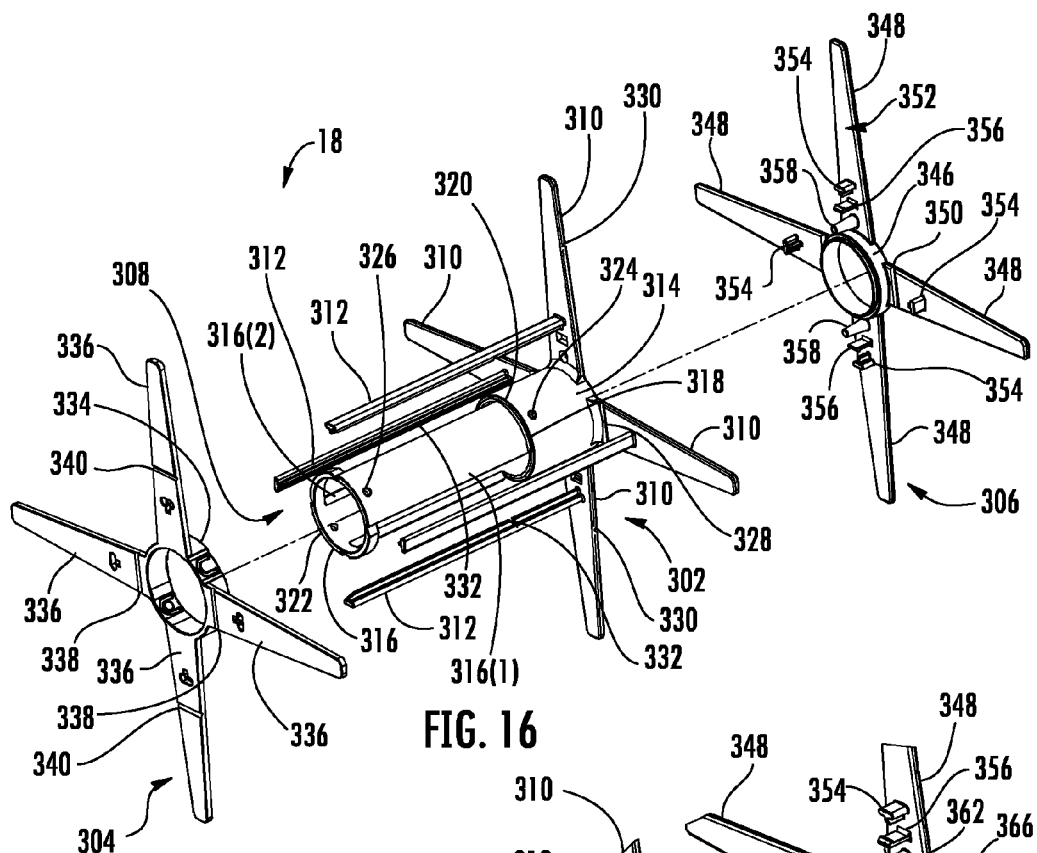
FIG. 16 is a schematic diagram of an exploded, perspective view of an exemplary embodiment of the collapsible cable reel in the uncollapsed state.

In this regard, as shown in FIG. 16, the collapsible cable reel 18 has a frame assembly 302, a first end assembly 304 and a second end assembly 306. The frame assembly 302 has a center member 308, frame arms 310 and cable supports 312. The center member 308 has a frame hub 314 and an extension 316. The extension 316 has spaced apart extension members 316(1), 316(2). The extension members 316(1), 316(2) connect to the frame hub 314 by a frame break away feature 318 at a first end 320. The frame break away feature 318 will be discussed in more detail below. The extension members 316 (1), 316(2) may interconnect at a second end 322. First indentations 324 may be formed in the frame hub 314 at the first end 320 proximate to the frame break away feature 318. Second indentations 326 may be formed in the extension members 316(1), 316(2) proximate the second end 322.

The frame arms 310 connect to and extend radially from frame hub 314. One or more of the frame arms 310 may have frame arm proximal breakaway features 328. Additionally, one or more of the frame arms 310 may have frame arm distal break away features 330. In the embodiment shown in FIG. 16, two frame arms 310 may have the frame arm proximal breakaway features 328 and two other frame arms 310 may have the frame arm distal breakaway features 330. The frame arm proximal break away feature 328 and the frame arm distal break away feature 330 will be discussed in more detail below. Although in FIG. 16 four frame arms 310 are shown, any number of frame arms 310 may be used.

Cable supports 312 connect to and extend from the frame arms 310 in a direction generally parallel with the center member 308. As shown in FIG. 16, each cable support 312 may connect to a respective frame arm 310. One or more of the cable supports 312 may have a support break away feature 332. In the embodiment shown in FIG. 16, two cable supports 312 have the support break away feature 332. Additionally, as shown in FIG. 16, the cable supports 312 having the support break away feature 332 extend from frame arms 310 that have the frame arm distal break away feature 330. The support break away feature 332 will be discussed in more detail below. Although in FIG. 16 four cable supports 312 are shown, any number of cable supports 312 may be used.

Continuing with reference to FIG. 16, the first end assembly 304 may have a first end hub 334 and first end arms 336. The first end arms 336 connect to and radially extend from the first end hub 334. One or more of the first end arms 336 may have first end arm proximal breakaway features 338. Additionally, one or more of the first end arms 336 may have first end arm distal break away features 340. In the embodiment shown in FIG. 16, two first end arms 336 have the first end arm proximal breakaway features 338 and two other first end arms 336 have the first end arm distal breakaway features 340. The first end arm proximal break away feature 338 and the first end arm distal break away feature 340 will be discussed in more detail below. Although in FIG. 16 four first end arms 336 are shown, any number of first end arms 336 may be used.

Figure 17:
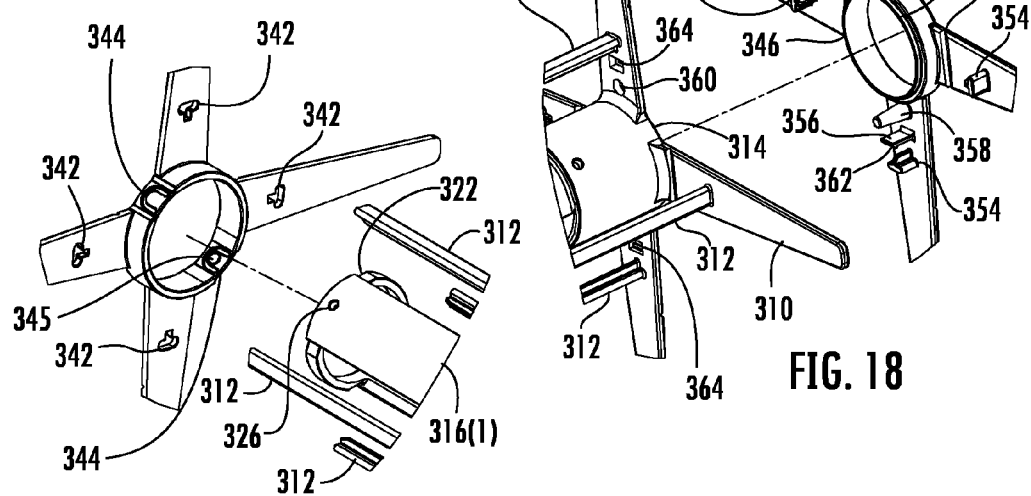
FIG. 17 is a schematic diagram of a partial, exploded view of a first end assembly of the collapsible cable reel of FIG. 16.

Referring now also to FIG. 17, each of the first end arms 336 may have support guides 342. The first end hub 334 may have snap locks 344. The support guides 342 and the snap locks 344 may be used to releasably connect the frame assembly 302 to the first end assembly 304 in a first position. In this regard, the snap locks 344 have inwardly extending protrusions 345 which snap into the second indentations 326 on the extension members 316(1), 316(2) to releasably retain the first end assembly 304 to the frame assembly 302.

With reference again to FIG. 16, the second end assembly 306 is shown having a second end hub 346 and second end arms 348. The second end arms 348 connect to and radially extend from the second end hub 346. One or more of the second end arms 348 may have second end arm proximal breakaway features 350. Additionally, one or more of the first end arms 348 may have second end arm distal break away features 352. In the embodiment shown in FIG. 16, two second end arms 348 may have the second end arm proximal breakaway features 350 and two other second end arms 348 may have the second end arm distal breakaway features 352. The second end arm proximal break away feature 350 and the second end arm distal break away feature 352 will be discussed in more detail below. Although in FIG. 16 four second end arms 348 are shown, any number of second end arms 348 may be used.

Figure 18:
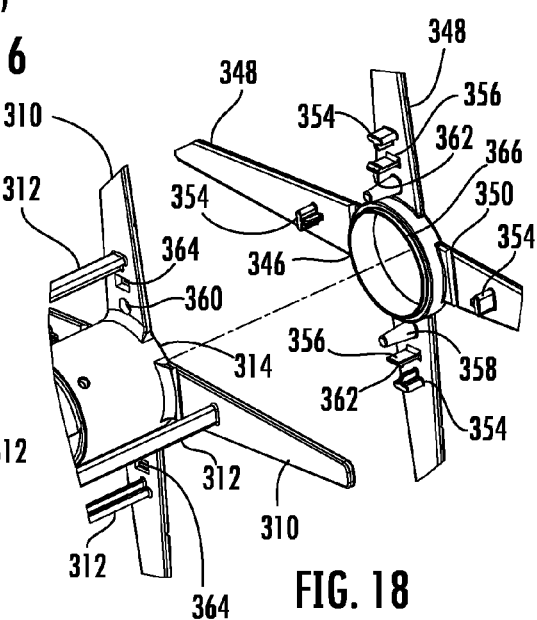
FIG. 18 is a schematic diagram of a partial exploded view of the frame assembly and the second end assembly of the collapsible cable reel of FIG. 16.

Referring now also to FIG. 18, support stub 354, locking tab 356, guide pin 358 are shown extending from one or more of the second end arms 348. In FIG. 18, two of the second end arms 348 are shown with the support stub 354, the locking tab 356, and the guide pin 358, and two other of the second end arms 348 are shown with only the support stub 354. The support stub 354, the locking tab 356, and the guide pin 358, are used to releasably connect the second end assembly 306 to the frame assembly 302. In this regard, the support stub 354 inserts into a support guide 342 (not shown) on the frame arm 310, the guide pin 358 inserts into guide pin aperture 360 on the frame arm 310, and the locking tab 356 has a hook end 362. When the locking tab 356 inserts into receiver 364 in the frame arm 310, the hook end 362 snap locks on to the inside of the frame arm 310 releasably connecting the second end assembly 306 to the frame assembly 302 (see FIGS. 21A and 21B). The second end hub 346 has a beveled edge perimeter 366 which inserts into the frame hub 314 when the second end assembly 306 is releasably connected to the frame assembly 302.

Referring now to FIGS. 19, 20, 21A and 21B, there are shown detail, perspective views of an end section of one of the cable support 312 (FIG. 19) one of the snap locks 344 (FIG. 20) and one of the locking tabs 356, (FIGS. 21A and 21B). As illustrated in FIG. 19, the profile of the cable support 312 is "T" shaped having a support surface 368 and a stiffening rib 370. The support surface 368 faces radially outwardly and the stiffening rib 370 extends radially inwardly when the cable support 312 is connected between the frame assembly 302 and the first end assembly 304. In this manner, the support surface 368 is adapted to receive the load of the cable wound on the cable reel 18 and the stiffening rib 370 provides additional strength to the cable support 312 to allow the cable support 312 to support the cable load and minimizing any bowing and/or the risk of unintentional breaking.

FIG. 20 illustrates a detail, perspective view of one of the snap locks 344. The snap lock 344 has a resilient flap 372 with a protrusion 345. The resilient slap 372 pivots to allow the extension member second end 322 to insert into the first end hub 334. The resilient flap 372 biases against the extension member second end 322 as the extension member second end 322 moves in the first end hub 334. The extension member second end 322 moves until the second indentation 326 on the extension member 316 aligns with the protrusion 345. Upon such alignment, the pressure caused by the biasing of the resilient flap 372 forces or snaps the protrusion 345 into the second indentation 326 releasably locking the extension member 316 to the first end hub 334. Moving the extension member 316 applies a force to the protrusion 345 causing the resilient flap 372 to pivot away from the extension member 316 thereby releasing the protrusion 345 from the second indentation 326 allowing the extension member to be removed from or further advanced through the first end hub 334.

FIGS. 21A and 21B illustrate detail, perspective views of one of the locking tabs 356 on the second end arm 348. The locking tab 356 has a cantilevered member 374 attached to the second end arm 348 at an attachment end 376 and a hook 378 extending generally perpendicular from a plane of the cantilevered member 374 at the hook end 362. The hook end 362 inserts through the receiver 364 in the frame arm 310. As the hook end 362 goes through the receiver 364, a receiver edge 380 exerts pressure on the hook 378 forcing the cantilevered member 374 to pivot in one direction, designated as "A" in FIG. 21A. When the hook 378 passes through the receiver 374, the receiver edge 380 stops exerting the pressure on the hook 378 and the cantilevered member 374 pivots in the other direction, designated as "B" in FIG. 21A, allowing the hook end 362 to move back towards its initial position. As the hook end 362 moves back towards its initial position, the hook 378 snaps against the receiver edge 380 releasably retaining the second end arm 348 to the frame arm 310 as shown in FIG. 21B. Applying pressure to the hook 378 moves the hook end 362 which causes the cantilevered member to pivot in the direction designated as "A" and allows the second end arm 348 to be disconnected or released from the frame arm 310.

Figure 22:
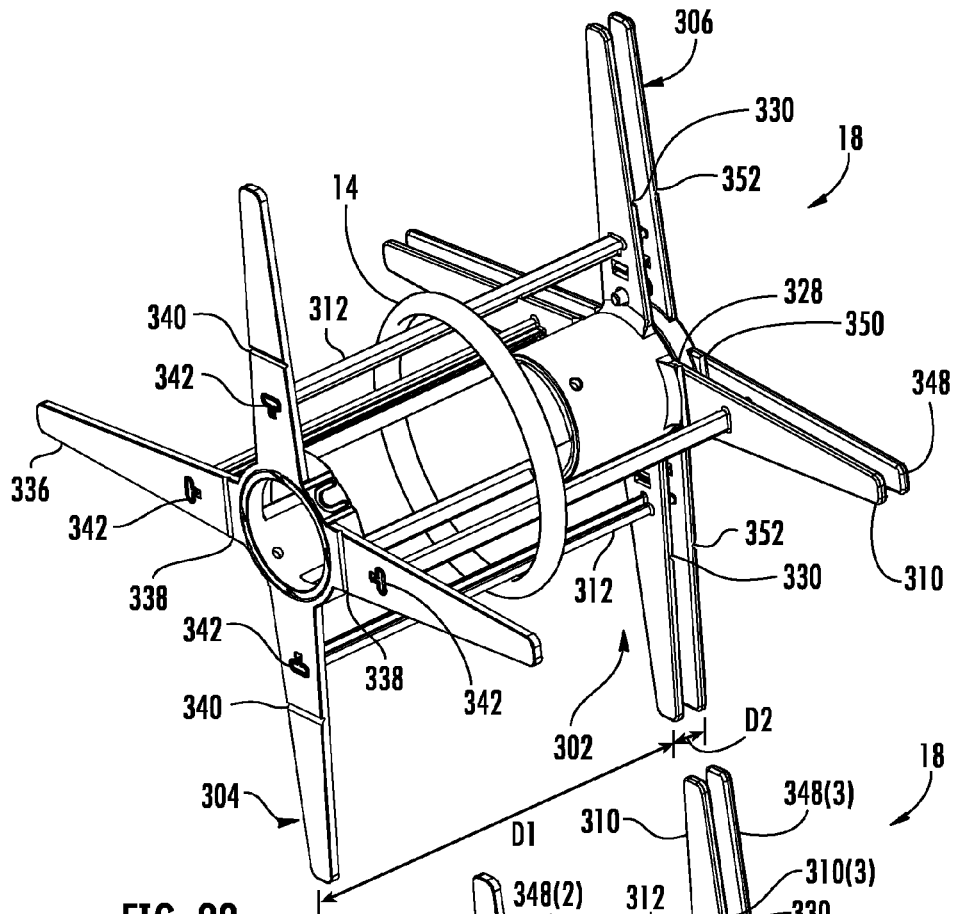
FIG. 22 is a schematic, perspective view of the collapsible cable reel of FIG. 16 in an assembled, uncollapsed state.

Referring now to FIG. 22, there is shown the collapsible cable reel 18 in the assembled, un-collapsed state with a length of cable, in this case, riser cable 14, wound thereon. However, it should be understood that the any type of cable may be wound on the collapsible cable reel 18. In operation, the cable may be wound on the collapsible cable reel 18 when the collapsible cable reel is in the assembled, un-collapsed state at the factory and shipped to the installation site. The collapsible cable reel 18 is in the uncollapsed or first position establishing a distance "D1" between the frame arms 310 and the first end arms 336. The distance "D1" may be any distance. As a non-limiting example, D1 may be about 10 inches. Also, a distance "D2" is established between the second end arms 348 and the frame arms 310 when the second end arms 348 are attached to the frame arms 310. A portion of the fiber optic cable 14 may be started and stored separately on the support stubs 354 extending between the frame arms 310 and second end arms 348. The distance "D2" may be any distance. As a non-limiting example D2 may be about ½ inch. When the cable 14 needs to be accessed later, a technician may easily access the cable 14 in the area between the frame arms 310 and second end arms 348 without having to access the cable on the cable supports 312. At the site the cable may be payed out to install the cable as necessary to facilitate the network installation. Once the required length of cable is payed out, the collapsible cable reel 18 may be collapsed and used to store any remaining slack of cable left wound on the collapsible cable reel 18.

Figure 23:
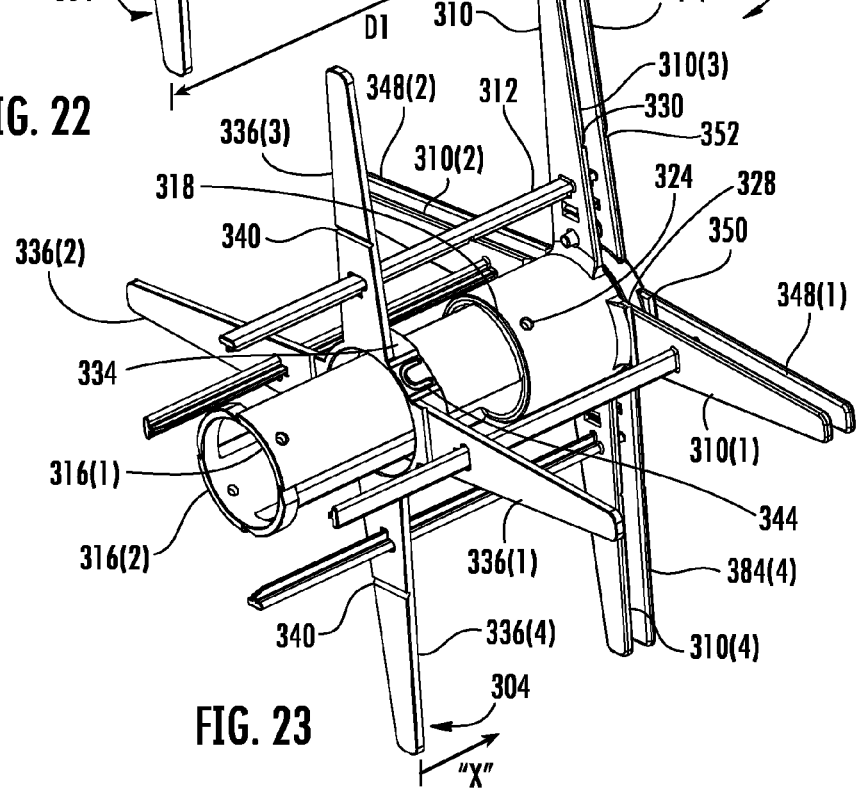
FIG. 23 is a schematic, perspective view of the collapsible cable reel of FIG. 16 transitioning from an uncollapsed to a collapsed state.

In this regard, FIG. 23 illustrates a perspective view of the collapsible cable reel 18 in the process of being collapsed, or transitioned toward a collapsed state or second position. The first step is to release the snap locks 344 releasably connecting the extension members 316(1), 316(2) to the first end hub 334. With the extension members 316(1), 316(2) unconnected from the first end hub 334 the first end assembly 304 may then be moved toward the frame arms 310 with the first end hub 334 passing about the extension members 316(1), 316(2). In FIG. 23, the direction of the movement of the first end assembly 304 is indicated by an arrow marked as "X." As the first end assembly 304 moves toward the frame arms 310, the support guides 342 pass about the cable supports 312 with the cable supports 312 being progressively extended past the first end arms 336. This allows the distance between the first end arms 334 and the frame arms 310 to progressively reduce until the snap locks 344 align with the first indentation 324. Upon alignment with the first indentations 324, the protrusions 345 on the snap locks 344 snap into and position in the first indentations 324. When the protrusions 345 snap into the first indentations 324, the first end assembly 304 is releasably connected to the frame assembly 302 in a second position. In the second position, the first end arms 336 are separated from the frame arms 310 by a distance "D3." The distance "D3" may be any distance provided it is less than distance "D1." As examples, and depending on the distance "D1", "D3" may be any distance. As an example, D3 may be about 5 inches. In the second position when the collapsible cable reel 18 is in the collapsed state, the distance "D2" may not change.

When the collapsible cable reel 18 is in the second position, the second end arms 348(1), 348(2) may be separated from the second end assembly 306 and the second end hub 366 at the second end proximal break-away feature 350 and discarded. Additionally, a portion of the second end arms 348(3), 348(4) may be separated from the rest of the second end assembly 306 at the second end distal break away feature 352 leaving only a portion of second end arms 384(5), 384(6) (shown on FIG. 24). Similarly, the first end arms 336(1), 336(2) may be separated from the first end assembly 304 and the first end hub 334 at the first end proximal break-away feature 338. The first end arms 336(1), 336(2) may be slid off of the support guides 312 and discarded. Additionally, a portion of the second end arms 336(3), 336(4) may be separated from the rest of the first end assembly 304 at the first end distal break away feature 340 leaving only a portion of first end arms 336(5), 336(6) (shown on FIG. 24).

Figure 24:
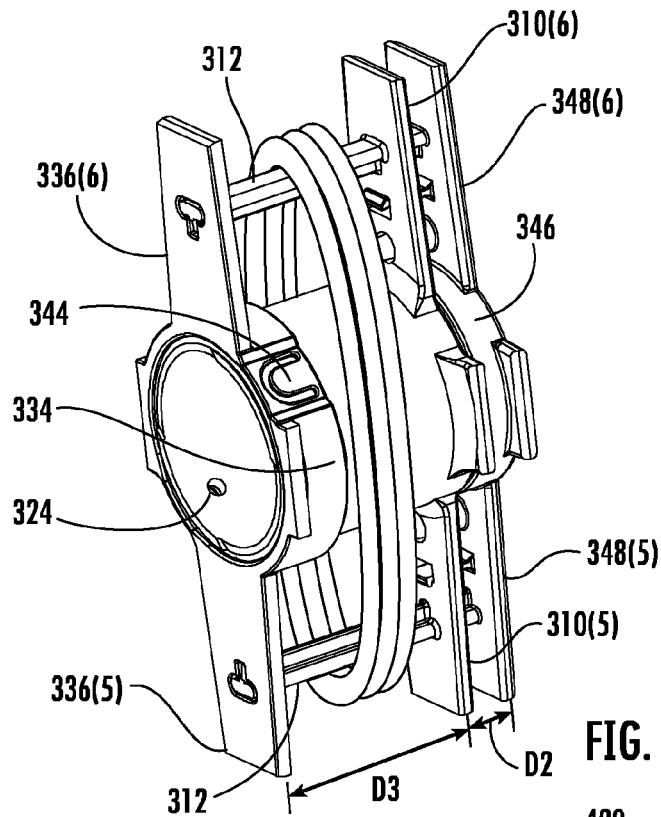
FIG. 24 is a schematic, perspective view of the collapsible cable reel of FIG. 16 in a collapsed state.

Once the first end arms 336 have been separated from the first end assembly 304 and the second end arms 348 have been separated from the second end assembly 306, the frame arms frame arms 310(1), 310(2) may be separated from the frame assembly 302 and the frame hub 314 at the frame arm proximal break-away feature 328. The frame arms 310(1), 310(2) and the cable supports 312 extending therefore may then be discarded. The frame arms 310(3) and 310(4) may then be separated at the frame arm distal break-away feature 330 leaving only a portion of frame arms 310(5), 310(6) (shown on FIG. 24). The cable supports 312 that extend from frame arms 310(5), 310(6) may be separated into two segments at the support break-away feature 332. The segment that extends past the frame arms 310(5), 310(6) may then be discarded. In this regard, the remaining segments of the two remaining frame arms 310(5), 310(6) will extend into the support guides 342 in frame arms 310(5), 310(6) but may not extend past the frame arms 310(5), 310(6) as shown in FIG. 24. Additionally, with the first end hub 334 releasably attached to the frame hub 314 by the snap locks 344 into first indentations 324, the extension members 316(1), 316(2) may be separated from the frame hub 314 at frame break-away feature 318 and discarded.

The collapsible cable reel 18 is in the collapsed state, or second position, as shown in FIG. 24. In the second position, any remaining cable slack not payed out may be left on the collapsible cable reel 18. Since in the second position, the collapsible cable reel 18 has a smaller size and, therefore, takes up less space, than the collapsible cable reel 18 in the uncollapsed or first position, the collapsible cable reel 18 may then be conveniently stored. Such storage may include, as non-limiting examples, being retained on a cable reel caddy, hung on a wall, and/or stored in an enclosure, box or cabinet.

Figure 25:
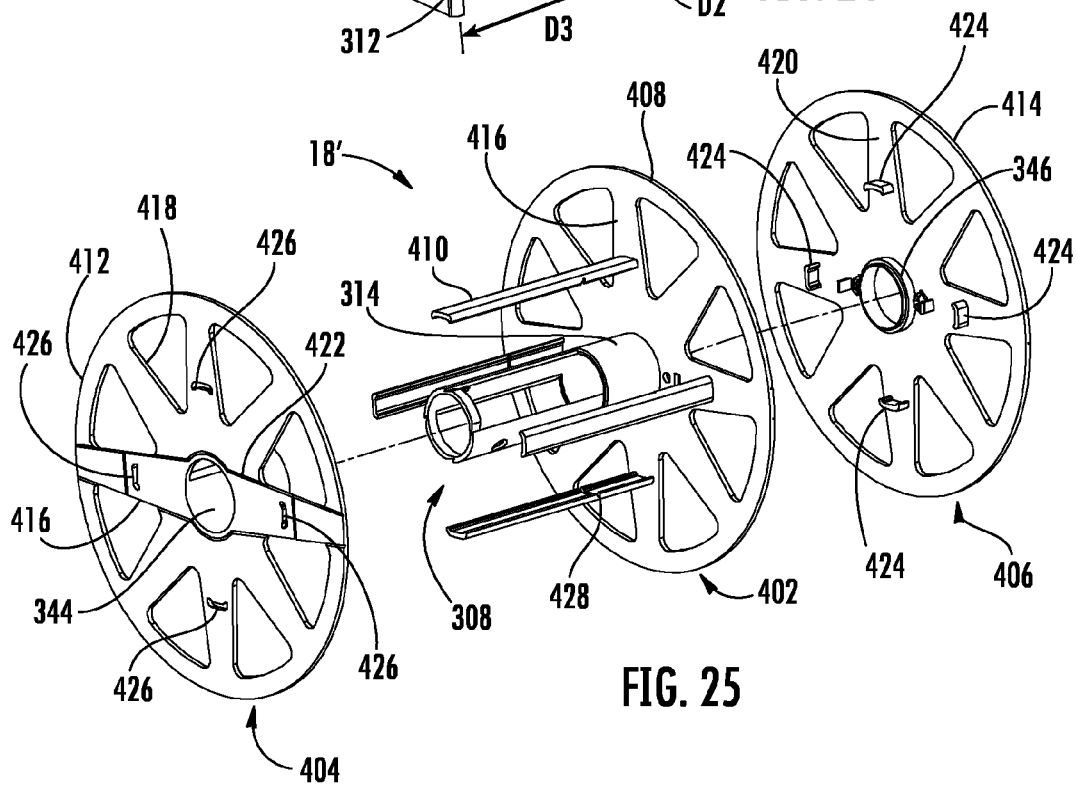
FIG. 25 is a schematic diagram of an exploded, perspective view of an exemplary embodiment of the collapsible cable reel in the uncollapsed state.

Referring now to FIGS. 25-28, there is shown an embodiment of the collapsible cable reel 18'. Collapsible cable reel 18' is similar to collapsible cable reel 18 as shown and described with reference to FIGS. 16-24, except that it does not have frame arms 310, first end arms 336 and second end arms 348. Instead, the collapsible cable reel 18', has a frame assembly 402, a first end assembly 404, and a second end assembly 406. The frame assembly 402 has a frame disk 408 with cable supports 410 extending therefrom. The first end assembly 404 has first disk 412 and the second end assembly 406 has a second disk 414. In FIG. 25, the cable supports 410 are shown as channels or "C" shaped instead of the "T" shape of cable supports 312 described above with reference to collapsible cable reel 18. However, the cable supports 312 may be used instead of cable supports 410 with collapsible cable reel 18'. Further, any type or shape of cable supports may be used with either collapsible cable reel 18 or collapsible cable reel 18'. The cable supports 410 insert into support guides 426 in a similar manner as cable supports 312 and support guides 342 as described above. The center member 308, frame hub 314, extension member 316, first end hub 334 and second end hub 346 interconnect and function in a similar manner as described above.

In FIG. 25, the frame disk 408, the first disk 412, and the second disk 414 have multiple spokes 416, 418, 420, respectively, extending radially outwardly. At least two each of the multiple spokes 416, 418, 420 has a break-away feature. As shown in FIG. 25, one of the spokes 418 of the first disk 412 has first disk break-away feature 422. The first disk break-away feature 422 extends around the first end hub 334 and along the sides of the spoke 418 to a point on the spoke 418. Although not shown in FIG. 25, the frame disk 408 and the second disk 414 may have similar break-away features as first disk break-away feature 422.

Figure 26:
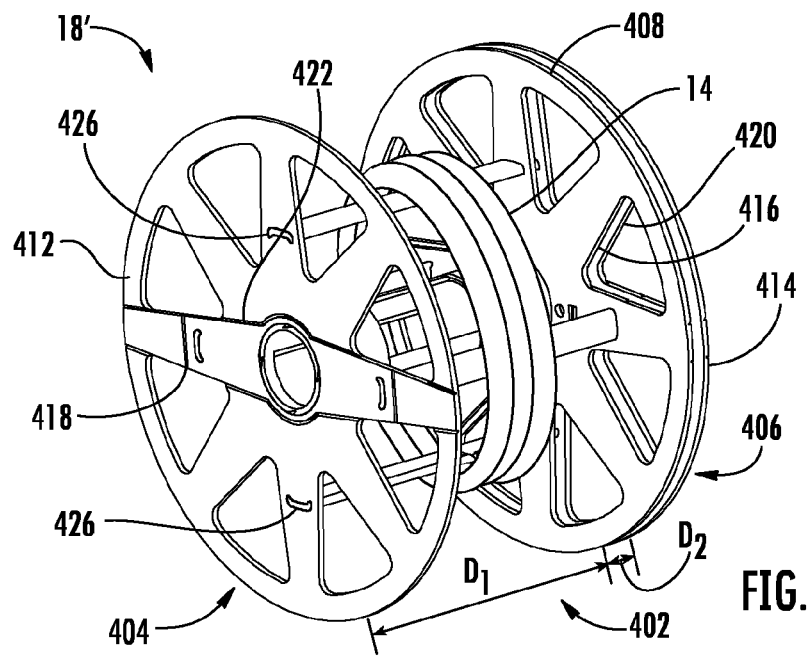
FIG. 26 is a schematic, perspective view of the collapsible cable reel of FIG. 25 in an assembled, uncollapsed state.

Referring now to FIG. 26, there is shown the collapsible cable reel 18' in the assembled, un-collapsed state with a length of cable, in this case, riser cable 14, wound thereon. However, it should be understood that the any type of cable may be wound on the collapsible cable reel 18'. In operation, the cable may be wound on the collapsible cable reel 18' when the collapsible cable reel is in the assembled, un-collapsed state at the factory and shipped to the installation site. The collapsible cable reel 18' is in the uncollapsed or first position establishing a distance "D1" between the frame disk 408 and the first disk 412. The distance "D1" may be any distance. As a non-limiting example, D1 may be about 10 inches. Also, a distance "D2" is established between the second disk 414 and the frame disk 408 when the second disk 414 is attached to the frame disk 408. A portion of the fiber optic cable 14 may be started and stored separately on the support stubs 424 extending between the frame disk 408 and second disk 414. The distance "D2" may be any distance. As a non-limiting example, D2 may be about ½ inch. When the cable 14 needs to be accessed later, a technician may easily access the cable 14 in the area between the frame disk 408 and second disk 414 without having to access the cable on the cable supports 410. At the site the cable may be payed out to install the cable as necessary to facilitate the network installation. Once the required length of cable is payed out, the collapsible cable reel 18' may be collapsed and used to store any remaining slack of cable left wound on the collapsible cable reel 18'.

Figure 27:
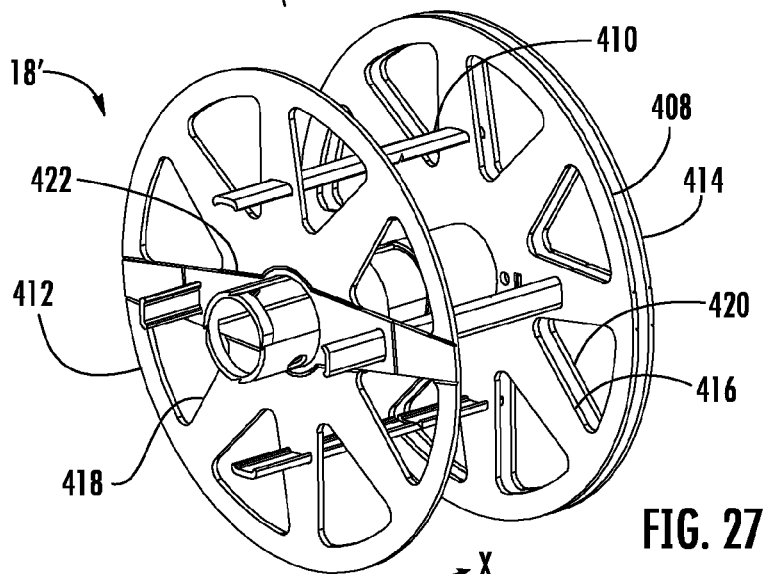
FIG. 27 is a schematic, perspective view of the collapsible cable reel of FIG. 25 transitioning from an uncollapsed to a collapsed state.

FIG. 27 illustrates the collapsible cable reel 18' being moved from uncollapsed state, or first position, to the collapsed state, or second position. When the collapsible cable reel 18' is to be placed in the collapsed state or second position, a portion of the process as described above with respect to collapsible cable reel 18, may be used. In this regard, the first step is to release the snap locks 344 releasably connecting the extension members 316(1), 316(2) to the first end hub 334. With the extension members 316(1), 316(2) unconnected from the first end hub 334 the first end assembly 404 may then be moved toward the frame disk 408 with the first end hub 334 passing about the extension members 316(1), 316(2). In FIG. 27, the direction of the movement of the first end assembly 404 is indicated by an arrow marked as "X." As the first end assembly 404 moves toward the frame disk 408, the support guides 426 pass about the cable supports 410 with the cable supports 410 being progressively extended past the first disk 412. This allows the distance between the first disk 412 and the frame disk 408 to progressively reduce until the snap locks 344 align with the first indentation 324. Upon alignment with the first indentations 324, the protrusions 345 on the snap locks 344 snap into and position in the first indentations 324. When the protrusions 345 snap into the first indentations 324, the first end assembly 404 is releasably connected to the frame assembly 402 in a second position. In the second position, the first disk 412 is separated from the frame disk 408 by a distance "D3." The distance "D3" may be any distance provided it is less than distance "D1." As examples, and depending on the distance "D1", "D3" may be any distance. As a non-limiting example, D3 may be 5 inches. In the second position when the collapsible cable reel 18' is in the collapsed state, the distance "D2" may not change.

The first disk 412 may then be separated along the first disk break-away feature 422. This results in the first end assembly 404 having two first end arms 418(1), 418(2) formed from the portion of the spokes 418 remaining after the separation. This may be seen with reference to FIG. 26. Similarly, the frame disk 408 and the second disk 414 may also be separated along the similarly arranged break-away features on those disks (not shown). This results in the frame assembly 402 having two frame arms 416(1), 416(2) formed from the portion of the spokes 416 remaining after the separation. Additionally, this results in the second end assembly 406 having two second end arms 420(1), 420(2) formed from the portion of the spokes 420 remaining after the separation. The rest of the frame assembly 402, first end assembly 404, and second end assembly 406 may be discarded.

Figure 28:
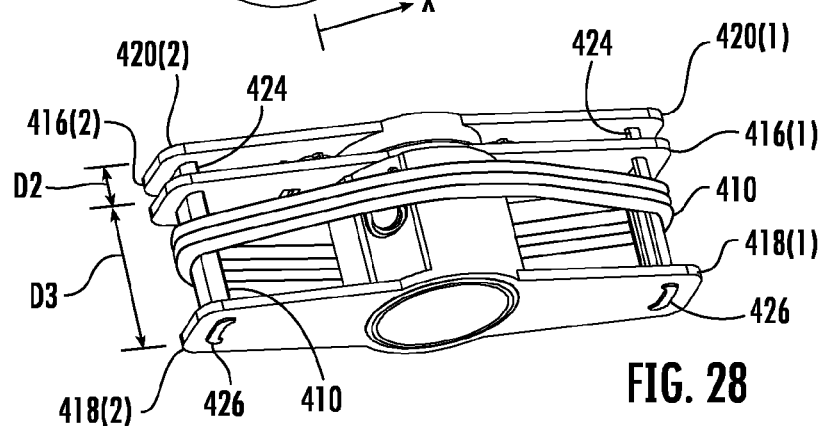
FIG. 28 is a schematic, perspective view of the collapsible cable reel of FIG. 25 in a collapsed state.

The cable supports 410 that extend from frame arms 416(1), 416(2) may be separated into two segments at the support break-away feature 426. The segment that extends past the first end arms 418(1), 418(2) may then be discarded. In this regard, the remaining segments of the two remaining cable supports 410 will extend into the support guides 426 in the first end arms 418(1), 418(2) but may not extend past the first end arms 418(1), 418(2) as shown in FIG. 28. Additionally, with the first end hub 334 releasably attached to the frame hub 314 by the snap locks 344 into first indentations 324, the extension members 316(1), 316(2) may be separated from the frame hub 314 at frame break-away feature 318 and discarded.

The collapsible cable reel 18' is in the collapsed state, or second position, as shown in FIG. 28. In the second position, any remaining cable slack not payed out may be left on the collapsible cable reel 18'. Since in the second position, the collapsible cable reel 18' has a smaller size and, therefore, takes up less space, than the collapsible cable reel 18' in the uncollapsed or first position, the collapsible cable reel 18' may then be conveniently stored. Such storage may include, as non-limiting examples, being retained on a cable reel caddy, hung on a wall, and/or stored in an enclosure, box or cabinet.

Figure 29:
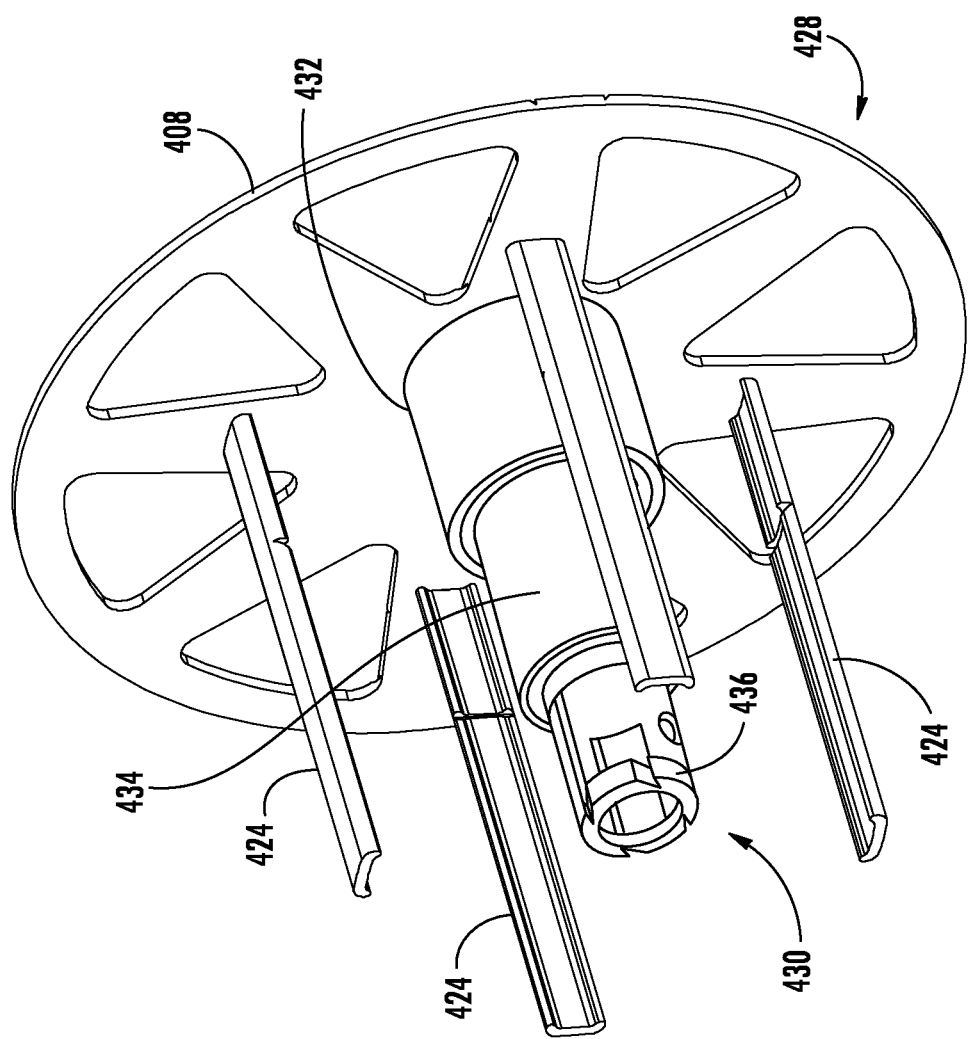
FIG. 29 is a schematic, perspective view of an embodiment of a frame assembly that can be used with the collapsible cable reel of FIG. 16 or FIG. 25.

Referring now to FIG. 29, there is shown another embodiment of a frame assembly 428 that may be used with collapsible cable reel 18, 18'. Instead of having a center member 308 with an extension member 316, the frame assembly 428 has a telescoping center member 430. The telescoping center member 430 has a frame hub 432 attached to frame disk 408. It should be understood that instead of the frame disk 408, and although not shown in FIG. 29, frame arms 310 may extend from frame hub 432 in the same manner as described above. The telescoping center member 430 may have one or more telescoping sections 434 and a telescoping second end 436. The telescoping second end 436 releasably attaches to the first end hub 334 (not shown) as described above. The telescoping second end 436, telescoping sections 434 and frame hub 432 may be formed to sequentially friction fit into each other to provide for telescoping function. In this manner, the friction fit retains the telescoping second end 436, telescoping sections 434 in an extended relationship, telescoped out, when the collapsible cable reel 18, 18' is in the uncollapsed state; and allows the telescoping second end 436, telescoping sections 434 to be sequentially inserted into each other, telescoped in, when the collapsible cable reel 18, 18' moves from the uncollapsed state toward, and in the collapsed state, or second position.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A collapsible cable reel, comprising:
    a frame assembly having a first end, a second end, at least one cable support, and a center member having a frame hub;
    a first end assembly connected to the first end of the frame assembly; and
    a second end assembly connected to the second end of the frame assembly,
    wherein at least one cable support extends from the frame assembly to the first end assembly and is adapted to support a length of cable wound around the collapsible cable reel, and
    wherein the lengths of the at least one cable supports and of the center member are shortenable allowing the first end assembly to move closer to the second end assembly and the collapsible cable reel to move from a first position to a second position.

2. The collapsible cable reel of claim 1, wherein in the first position the collapsible cable reel is in an uncollapsed state.

3. The collapsible cable reel of claim 2, wherein the frame assembly comprises at least one frame arm extending radially from the frame hub.

4. The collapsible cable reel of claim 1, wherein in the second position the collapsible cable reel is in a collapsed state.

5. The collapsible cable reel of claim 1, wherein the center member comprises an extension member, and wherein the center member is shortenable by removing the extension member.

6. The collapsible cable reel of claim 1, wherein the center member comprises a telescoping extension member, and wherein the center member is shortenable by reducing the length of the telescoping extension member.

7. The collapsible cable reel of claim 1, wherein the first end assembly comprises at least one first end arm extending radially from a first end hub.

8. The collapsible cable reel of claim 1, wherein the second end assembly comprises at least one second end arm extending radially from a second end hub.

9. The collapsible cable reel of claim 1, wherein the frame assembly comprises a frame disk connected to the frame hub.

10. The collapsible cable reel of claim 1, wherein the first end assembly comprises a first disk connected to the first end hub.

11. The collapsible cable reel of claim 1, wherein the second end assembly comprises a second disk connected to the second end hub.

12. The collapsible reel of claim 1, wherein the collapsible cable reel is adapted to store cable slack in at least one of the first position and second position.

13. The collapsible cable reel of claim 1, wherein the collapsible cable reel is removably mountable in an enclosure.

14. The collapsible cable reel of claim 1, wherein the collapsible cable reel is removably mountable in an enclosure in one or both of the first position and the second position.

15. A method of operating a collapsible cable reel, comprising:
    providing a frame assembly having a first end and a second end and a plurality of cable supports, a first end assembly connected to the first end of the frame assembly and a second end assembly connected to the second end of the frame assembly, wherein a plurality of cable supports extend from the frame assembly to the first end assembly and are adapted to support a length of cable wound around the collapsible cable reel, and wherein the length of the plurality of cable supports is shortenable;
    paying out at least a portion of the length of cable;
    retaining remaining slack of the cable not payed out on the plurality of cable supports; and
    shortening a length of each of the plurality of cable supports allowing the first end assembly to move closer to the second end assembly and the collapsible cable reel to move from a first position to a second position.

16. The method of claim 15, further comprising, removably mounting the collapsed collapsible cable reel with the retained remaining slack of the cable in an enclosure.

17. The method of claim 15, wherein the cable is fiber optic cable.

18. The method of claim 17, wherein the fiber optic cable is one of riser cable and drop cable, used in a multiple dwelling unit.

19. The method of claim 15, wherein the length of cable wound on the plurality of cable supports is at least 100 feet.

20. The method of claim 19, wherein the cable is fiber optic cable.

21. The method of claim 20, wherein in the fiber optic cable is one of riser cable and drop cable, used in a multiple dwelling unit.

22. The method of claim 15, further comprising, removably mounting the collapsible cable reel in an enclosure.

* * * * *